(12) United States Patent
Suemitsu et al.

(10) Patent No.: US 12,487,038 B2
(45) Date of Patent: Dec. 2, 2025

(54) RADIATIVE COOLING DEVICE

(71) Applicant: Osaka Gas Co., Ltd., Osaka (JP)

(72) Inventors: Masahiro Suemitsu, Osaka (JP); Masayuki Sugimoto, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 163 days.

(21) Appl. No.: 18/283,877

(22) PCT Filed: Mar. 24, 2022

(86) PCT No.: PCT/JP2022/013947
§ 371 (c)(1),
(2) Date: Sep. 25, 2023

(87) PCT Pub. No.: WO2022/202990
PCT Pub. Date: Sep. 29, 2022

(65) Prior Publication Data
US 2024/0175648 A1 May 30, 2024

(30) Foreign Application Priority Data
Mar. 26, 2021 (JP) .................. 2021-054011

(51) Int. Cl.
*F28F 13/18* (2006.01)
*B32B 7/023* (2019.01)
(Continued)

(52) U.S. Cl.
CPC .............. *F28F 13/18* (2013.01); *B32B 7/023* (2019.01); *B32B 7/12* (2013.01); *B32B 15/085* (2013.01);
(Continued)

(58) Field of Classification Search
CPC ............. F28F 13/18; B32B 7/023; B32B 7/12
See application file for complete search history.

(56) References Cited

U.S. PATENT DOCUMENTS 3,812,073 A * 5/1974 Ito .................... C08K 5/103
524/751
9,012,044 B2 * 4/2015 Bright ................. C03C 17/36
428/688
(Continued)

FOREIGN PATENT DOCUMENTS

JP    H09279131 A  * 10/1997
JP    2015100942 A    6/2015
(Continued)

OTHER PUBLICATIONS

Translation of JPH09279131A named Translation—JPH09279131A (Year: 1997).*

(Continued)

*Primary Examiner* — Paul Alvare
(74) *Attorney, Agent, or Firm* — The Webb Law Firm

(57) ABSTRACT

Provided is a radiative cooling device that is flexible, has increased weather resistance, and can be produced at a low cost. The radiative cooling device includes: an infrared radiative layer A having a radiative surface H for radiating infrared light IR; and a light reflective layer B on a side of the infrared radiative layer A, which is opposite to the radiative surface H. The infrared radiative layer A is a resin material layer J having a thickness adjusted so that the resin material layer emits heat radiation energy greater than absorbed solar energy in a wavelength range from 8 μm to 14 μm. The resin material layer J includes a vinyl chloride-based resin as a resin material in which a plasticizer is mixed. The plasticizer is any of phthalic acid esters, aliphatic dibasic acid esters, and phosphoric acid esters.

15 Claims, 14 Drawing Sheets

(51) Int. Cl.
  *B32B 7/12* (2006.01)
  *B32B 15/085* (2006.01)
  *B32B 27/20* (2006.01)
  *B32B 27/22* (2006.01)
  *B32B 27/30* (2006.01)
  *B32B 27/32* (2006.01)
  *F25B 23/00* (2006.01)

(52) U.S. Cl.
  CPC .............. *B32B 27/20* (2013.01); *B32B 27/22* (2013.01); *B32B 27/304* (2013.01); *B32B 27/32* (2013.01); *B32B 2307/416* (2013.01); *B32B 2307/7376* (2023.05); *F25B 23/003* (2013.01); *F28F 2245/06* (2013.01)

(56) References Cited

U.S. PATENT DOCUMENTS

| | | | | |
|---|---|---|---|---|
| 2005/0167612 | A1* | 8/2005 | Jaffer | F25B 23/003 250/458.1 |
| 2017/0248381 | A1* | 8/2017 | Yang | F28F 21/089 |
| 2018/0180331 | A1* | 6/2018 | Yu | F24S 70/60 |
| 2019/0184687 | A1* | 6/2019 | Yasuda | B32B 27/08 |
| 2020/0240725 | A1* | 7/2020 | Suemitsu | G02B 5/208 |
| 2021/0087104 | A1* | 3/2021 | Heurtefeu | C03C 17/3639 |
| 2021/0262745 | A1 | 8/2021 | Suemitsu et al. | |
| 2021/0310700 | A1* | 10/2021 | Lee | F24S 70/225 |
| 2022/0186004 | A1* | 6/2022 | Goto | C08L 23/14 |

FOREIGN PATENT DOCUMENTS

| | | |
|---|---|---|
| JP | 2018526599 A | 9/2018 |
| JP | 2019515967 A | 6/2019 |
| WO | WO-2020022156 A1 * 1/2020 ............ C03C 17/36 |
| WO | 2020195743 A1 | 10/2020 |
| WO | 2020237813 A1 | 12/2020 |

OTHER PUBLICATIONS

Translation of WO2020022156A1 named Translation—WO2020022156A1 (Year: 2020).*

* cited by examiner

RADIATIVE COOLING DEVICE

CROSS-REFERENCE TO RELATED APPLICATIONS

This application is the United States national phase of International Application No. PCT/JP2022/013947 filed Mar. 24, 2022, and claims priority to Japanese Patent Application No. 2021-054011 filed Mar. 26, 2021, the disclosures of which are hereby incorporated by reference in their entireties.

BACKGROUND OF THE INVENTION

Field of the Invention

The present invention relates to a radiative cooling device including: an infrared radiative layer having a radiative surface for radiating infrared light; and a light reflective layer on a side of the infrared radiative layer, which is opposite to the radiative surface, wherein the infrared radiative layer is a resin material layer that has a thickness adjusted so that the resin material layer emits heat radiation energy greater than absorbed solar energy in a wavelength range from 8 µm to 14 µm.

Description of Related Art

Radiative cooling is a phenomenon in which the temperature of a substance decreases as a result of the substance radiating electromagnetic waves such as infrared rays to the surrounding environment. By using this phenomenon, it is possible to configure a radiative cooling device that cools a cooling target without consuming energy such as electricity, for example.

The cooling target can be cooled even under solar radiation during the day as a result of a light reflective layer sufficiently reflecting sunlight.

That is, the light reflective layer reflects light (ultraviolet light, visible light, infrared light) that has passed through an infrared radiative layer, and causes the light to be radiated from a radiative surface. This avoids a situation in which the light (ultraviolet light, visible light, infrared light) that has passed through the infrared radiative layer is projected onto the cooling target and the cooling target is heated, and thus the cooling target can be cooled even under solar radiation during the day.

In addition to light that has passed through the infrared radiative layer, light radiated from the infrared radiative layer toward the light reflective layer is also reflected by the light reflective layer toward the infrared radiative layer, but in the following description, the light reflective layer is described as being provided for the purpose of reflecting light (ultraviolet light, visible light, infrared light) that has passed through the infrared radiative layer.

As a conventional example of such a radiative cooling device, there is a radiative cooling device in which a dimethyl siloxane resin, a vinylidene fluoride resin, an acrylic acid resin, or a methyl methacrylate resin is used as a resin material forming a resin material layer (see Patent Document 1, for example).

PATENT DOCUMENTS

Patent Document 1: JP 2018-526599A

SUMMARY OF THE INVENTION

In order to reduce the cost of the radiative cooling device, there is a desire to reduce the cost of the resin material layer.

Also, in order to make the radiative cooling device flexible, there is a desire to soften the resin material layer. That is, a flexible radiative cooling device can be obtained when the light reflective layer is configured as a thin film of silver, for example, to be flexible and the resin material layer that constitutes the infrared radiative layer is soft. Also, there is a desire to increase the weather resistance of the radiative cooling device at the same time as making the radiative cooling device flexible.

When a radiative cooling device is flexible and weather-resistant as described above, it is possible to impart radiative cooling properties to existing outdoor facilities through post-attachment of the radiative cooling device to external walls or the like of the outdoor facilities, and thus convenience is improved.

The present invention was made in view of the above circumstances, and it is an object thereof to provide a radiative cooling device that is flexible and has increased weather resistance while reducing the cost.

A radiative cooling device according to the present invention includes:
an infrared radiative layer having a radiative surface for radiating infrared light; and
a light reflective layer on a side of the infrared radiative layer, which is opposite to the radiative surface,
wherein the infrared radiative layer is a resin material layer that has a thickness adjusted so that the resin material layer emits heat radiation energy greater than absorbed solar energy in a wavelength range from 8 µm to 14 µm,
the resin material layer includes a vinyl chloride-based resin as a resin material in which a plasticizer is mixed, and
the plasticizer is at least one compound selected from the group consisting of phthalic acid esters, aliphatic dibasic acid esters, and phosphoric acid esters.

The vinyl chloride-based resin used in the present invention is a homopolymer of vinyl chloride or vinylidene chloride or a copolymer of vinyl chloride or vinylidene chloride, and produced with use of a conventionally-known polymerization method.

Sufficient heat radiation can be obtained in the atmospheric window range with use of the vinyl chloride-based resin.

That is, heat radiation properties of the vinyl chloride-based resin are equivalent to those of a fluorocarbon resin and silicone rubber with which a large amount of heat radiation can be obtained in the atmospheric window range, and the vinyl chloride-based resin is far more inexpensive than these resins, and therefore is effective to produce, at a low cost, a radiative cooling device whose temperature falls below the ambient temperature in direct sunlight.

The resin material layer is softened by the plasticizer mixed in the vinyl chloride-based resin, and accordingly, the radiative cooling device has flexibility.

The plasticizer added to the vinyl chloride-based resin softens the vinyl chloride-based resin, and accordingly, even if another object comes into contact with the resin material layer, the resin material layer flexibly deforms to conform to the object and is kept from being damaged, and therefore, a good appearance can be maintained for a long period of time. Note that a thin film of fluorocarbon resin is hard, and accordingly cannot flexibly deform and is likely to be damaged when another object comes into contact therewith, and therefore, it is difficult to maintain a good appearance.

Moreover, when the plasticizer is added to the vinyl chloride-based resin, the resin material layer deforms when heated to 80° C. or more, and accordingly, even if a scratch is formed in a surface of the resin material layer, the scratch disappears and the surface becomes smooth. That is, the resin material layer can repair the scratch by itself. The fluorocarbon resin and silicone rubber do not have such characteristics. Owing to the characteristics of the soft vinyl chloride-based resin, a good appearance can be maintained for a long period of time. Consequently, radiative cooling properties can be maintained for a long period of time.

As described above, durability of a radiative cooling material increases when a plasticizer is added thereto.

Moreover, the vinyl chloride-based resin is flame retardant and unlikely to undergo biodegradation, and therefore can be preferably used as the resin material to form the resin material layer of the radiative cooling device that is used outdoors for a long period of time.

Moreover, the plasticizer mixed in the vinyl chloride-based resin is at least one compound selected from the group consisting of phthalic acid esters, aliphatic dibasic acid esters, and phosphoric acid esters, and accordingly, the plasticizer is unlikely to absorb ultraviolet rays (ultraviolet light in a wavelength range from 295 nm to 400 nm) included in sunlight, and therefore, the weather resistance of the vinyl chloride-based resin in which the plasticizer is mixed can be increased.

If the plasticizer mixed in the vinyl chloride-based resin absorbs ultraviolet rays, there is a risk that hydrolysis of the plasticizer will progress, and consequently, the vinyl chloride-based resin will be colored (to brown) as a result of dehydrochlorination or the like, and mechanical strength will decrease. However, the plasticizer is not likely to absorb ultraviolet rays included in sunlight, and therefore, it is possible to increase the weather resistance of the vinyl chloride-based resin in which the plasticizer is mixed.

In short, with the above-described characteristic configuration of the radiative cooling device according to the present invention, it is possible to provide a radiative cooling device that is flexible and has increased weather resistance while reducing the cost.

In a characteristic configuration of the radiative cooling device according to the present invention, the plasticizer is mixed in an amount of 1 part by weight or more and 200 parts by weight or less relative to 100 parts by weight of the vinyl chloride-based resin.

That is, the plasticizer is mixed in an amount of 1 part by weight or more and 200 parts by weight or less relative to 100 parts by weight of the vinyl chloride-based resin, and accordingly, it is possible to impart adequate flexibility to the vinyl chloride-based resin.

In a characteristic configuration of the radiative cooling device according to the present invention, the plasticizer includes at least one aliphatic dibasic acid ester selected from the group consisting of adipic acid esters, adipic acid ester copolymers, azelaic acid esters, azelaic acid ester copolymers, sebacic acid esters, sebacic acid ester copolymers, succinic acid esters, and succinic acid ester copolymers.

That is, it is possible to appropriately keep the plasticizer from absorbing ultraviolet rays included in sunlight by using an aliphatic dibasic acid ester selected from these compounds as the plasticizer mixed in the vinyl chloride-based resin.

In a characteristic configuration of the radiative cooling device according to the present invention, the plasticizer includes an aliphatic dibasic acid ester formed through ester bonding between an aliphatic dibasic acid and two molecules of a saturated aliphatic alcohol.

That is, it is possible to appropriately keep the plasticizer from absorbing ultraviolet rays included in sunlight by using an aliphatic dibasic acid ester formed through ester bonding between an aliphatic dibasic acid and two molecules of a saturated aliphatic alcohol as the plasticizer.

In a characteristic configuration of the radiative cooling device according to the present invention, the plasticizer includes a phthalic acid ester formed through ester bonding between phthalic acid and two molecules of a saturated aliphatic alcohol.

That is, it is possible to appropriately keep the plasticizer from absorbing ultraviolet rays included in sunlight by using a phthalic acid ester formed through ester bonding between phthalic acid and two molecules of a saturated aliphatic alcohol as the plasticizer.

In a characteristic configuration of the radiative cooling device according to the present invention, the plasticizer includes a phosphoric acid ester that is a phosphoric acid triester or an aromatic phosphoric acid ester.

That is, it is possible to appropriately keep the plasticizer from absorbing ultraviolet rays included in sunlight by using a phosphoric acid triester or an aromatic phosphoric acid ester as a phosphoric acid ester that functions as the plasticizer.

In a characteristic configuration of the radiative cooling device according to the present invention, the thickness of the resin material layer is adjusted so that the resin material layer has:

light absorption properties that allow for a wavelength average absorptivity of 13% or less in a wavelength range from 0.4 µm to 0.5 µm, a wavelength average absorptivity of 4% or less in a wavelength range from 0.5 µm to 0.8 µm, a wavelength average absorptivity of 1% or less in a wavelength range from 0.8 µm to 1.5 µm, and a wavelength average absorptivity of 40% or less in a wavelength range from 1.5 µm to 2.5 µm; and heat radiation properties that allow for a wavelength average emissivity of 40% or more in the wavelength range from 8 µm to 14 µm.

Note that the wavelength average absorptivity in the wavelength range from 0.4 µm to 0.5 µm refers to an average value of absorptivities at respective wavelengths within the range from 0.4 µm to 0.5 µm. The same applies to the wavelength average absorptivity in the wavelength range from 0.5 µm to 0.8 µm, the wavelength average absorptivity in the wavelength range from 0.8 µm to 1.5 µm, and the wavelength average absorptivity in the wavelength range from 1.5 µm to 2.5 µm. Also, similar descriptions including the description of emissivity refer to similar average values, and this applies to the following description of the present specification.

That is, the absorptivity and the emissivity (light emissivity) of the resin material layer vary according to the thickness of the resin material layer. Therefore, the thickness of the resin material layer needs to be adjusted in such a manner that the resin material layer does not absorb sunlight as far as possible and radiates a large amount of heat in the wavelength band of so-called atmospheric window (light wavelength range from 8 µm to 14 µm).

Specifically, from the viewpoint of absorptivity (light absorption properties) of the resin material layer for sunlight, the wavelength average absorptivity in the wavelength range from 0.4 µm to 0.5 µm needs to be 13% or less, the wavelength average absorptivity in the wavelength range from 0.5 µm to 0.8 µm needs to be 4% or less, the wavelength average absorptivity in the wavelength range from 0.8 µm to 1.5 µm needs to be 1% or less, and the wavelength average absorptivity in the wavelength range from 1.5 μm to 2.5 μm needs to be 40% or less. Note that a wavelength average absorptivity in a wavelength range from 2.5 μm to 4 μm may be 100% or less.

In the case of such an absorptivity distribution, the absorptivity for sunlight is 10% or less, which corresponds to an energy of 100 W or less.

The absorptivity for sunlight increases as the film thickness of the resin material layer is increased. When the resin material layer is made thick, the emissivity in the atmospheric window becomes approximately 1, and the amount of heat radiated toward the universe at that time is 125 W/m² to 160 W/m².

The amount of sunlight absorbed by the light reflective layer is preferably 50 W/m² or less.

Accordingly, cooling progresses if the sum of amounts of sunlight absorbed by the resin material layer and the light reflective layer is 150 W/m² or less and the atmosphere is in good conditions. It is preferable to use a resin material layer that has a small absorptivity in the vicinity of a peak value of the sunlight spectrum as described above.

Also, from the viewpoint of the emissivity of infrared radiation (heat radiation properties) of the resin material layer, the wavelength average emissivity in the wavelength range from 8 μm to 14 μm needs to be 40% or more.

That is, in order to emit heat of about 50 W/m² absorbed from sunlight by the light reflective layer to the universe from the resin material layer, the resin material layer needs to radiate heat more than or equal to the absorbed heat.

For example, when the ambient temperature is 30° C., the maximum heat radiation in the atmospheric window of the wavelength range from 8 μm to 14 μm is 200 W/m² (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling device is actually used in a humid environment, and the atmospheric window becomes narrower in such a case as well. When the radiative cooling device is used in a lowland, heat radiation in the atmospheric window band is estimated to be 160 W/m² (calculated with the emissivity taken as 1) at 30° C. under good conditions.

Moreover, when there is haze or smog in the sky, as is often the case in Japan, the atmospheric window further becomes narrower and radiation to the universe becomes about 125 W/m².

In view of the foregoing, the radiative cooling device cannot be used in a lowland in the mid-latitude area unless the wavelength average emissivity in the wavelength range from 8 μm to 14 μm is 40% or more (heat radiation intensity in the atmospheric window band is 50 W/m² or more).

Therefore, when the thickness of the resin material layer is adjusted so as to fall within the range of optical prescriptions described above, the amount of heat output in the atmospheric window becomes greater than the amount of heat input through absorption of sunlight, and radiative cooling can be performed in an outdoor environment even under solar radiation during the day.

In short, with the above-described characteristic configuration of the radiative cooling device according to the present invention, the amount of heat output in the atmospheric window becomes greater than the amount of heat input through absorption of sunlight, and radiative cooling can be performed in an outdoor environment even under solar radiation.

In a characteristic configuration of the radiative cooling device according to the present invention, the resin material layer has a thickness of 10 μm or more and 100 μm or less.

That is, in the case where the resin material forming the resin material layer is a vinyl chloride-based resin, radiative cooling can be performed appropriately in an outdoor environment even under solar radiation when the resin material layer has a thickness of 10 μm or more and 100 μm or less.

In short, with the characteristic configuration of the radiative cooling device according to the present invention, the amount of heat output in the atmospheric window becomes greater than the amount of heat input through absorption of sunlight, and radiative cooling can be performed appropriately in an outdoor environment even under solar radiation.

In a characteristic configuration of the radiative cooling device according to the present invention, the light reflective layer has a reflectance of 90% or more in a wavelength range from 0.4 μm to 0.5 μm, and a reflectance of 96% or more with respect to light having a wavelength longer than 0.5 μm.

The spectrum of sunlight spans from a wavelength of 0.295 μm to a wavelength of 4 μm, and the intensity increases as the wavelength increases from 0.4 μm, and the intensity is particularly high in a wavelength range from 0.5 μm to 2.5 μm.

When the light reflective layer has reflective properties that allow for a reflectance of 90% or more in the wavelength range from 0.4 μm to 0.5 μm and a reflectance of 96% or more for light having a wavelength longer than 0.5 μm, solar energy absorbed by the light reflective layer is as small as about 5% or less.

Consequently, solar energy absorbed by the light reflective layer at the time of meridian transit in summer can be suppressed to about 50 W/m² or less, and the resin material layer can favorably perform radiative cooling.

Note that, in the present specification, the spectrum of sunlight is in accordance with the standard of AM1.5G, unless otherwise stated.

In short, with the above-described characteristic configuration of the radiative cooling device according to the present invention, it is possible to suppress absorption of solar energy by the light reflective layer and allow the resin material layer to favorably perform radiative cooling.

In a characteristic configuration of the radiative cooling device according to the present invention, the light reflective layer includes silver or a silver alloy and has a thickness of 50 nm or more.

In order to make the light reflective layer have the reflectance characteristics described above, i.e., a reflectance of 90% or more in the wavelength range from 0.4 μm to 0.5 μm and a reflectance of 96% or more for light having a wavelength longer than 0.5 μm, silver or a silver alloy needs to be used as a reflective material that constitutes the radiative surface side portion of the light reflective layer.

In a case where sunlight is to be reflected only by silver or a silver alloy in such a manner as to satisfy the reflective properties described above, a thickness of 50 nm or more is required.

In short, with the above-described characteristic configuration of the radiative cooling device according to the present invention, it is possible to appropriately suppress absorption of solar energy by the light reflective layer and allow the resin material layer to favorably perform radiative cooling.

In a characteristic configuration of the radiative cooling device according to the present invention, the light reflective layer has a layered structure including (i) silver or a silver alloy on a side close to the resin material layer and (ii) aluminum or an aluminum alloy on a side apart from the resin material layer.

That is, in order to make the light reflective layer have the reflectance characteristics described above, it is also possible to adopt a layered structure including silver or a silver alloy and aluminum or an aluminum alloy. In this case as well, it is necessary to use silver or a silver alloy as the reflective material on the radiative surface side. In this case, the thickness of silver needs to be 10 nm or more, and the thickness of aluminum needs to be 30 nm or more.

Since aluminum or an aluminum alloy is inexpensive compared with silver or a silver alloy, it is possible to reduce the cost of the light reflective layer while making the light reflective layer have appropriate reflectance characteristics.

That is, when the layered structure including silver or a silver alloy and aluminum or an aluminum alloy is adopted for the light reflective layer and the thickness of silver or the silver alloy, which is expensive, is reduced to reduce the cost of the light reflective layer, it is possible to reduce the cost of the light reflective layer while making the light reflective layer have appropriate reflectance characteristics.

In short, with the characteristic configuration of the radiative cooling device according to the present invention, it is possible to reduce the cost of the light reflective layer while making the light reflective layer have appropriate reflectance characteristics.

In a characteristic configuration of the radiative cooling device according to the present invention, the radiative cooling device further includes a protective layer between the infrared radiative layer and the light reflective layer, and the protective layer includes a polyolefin resin and has a thickness of 300 nm or more and 40 μm or less, or includes a polyethylene terephthalate resin and has a thickness of 17 μm or more and 40 μm or less.

That is, sunlight incident on the radiative surface of the resin material layer, which is the infrared radiative layer, passes through the resin material layer and the protective layer, and is then reflected by the light reflective layer on the side of the resin material layer opposite to the radiative surface, and is released from the radiative surface to the outside of the system.

The protective layer is formed from a polyolefin resin with a thickness of 300 nm or more and 40 μm or less or an ethylene terephthalate resin with a thickness of 17 μm or more and 40 μm or less, and accordingly, the protective layer suppresses discoloration of silver or a silver alloy included in the light reflective layer even under solar radiation during the day, and therefore, the radiative cooling device can appropriately exhibit a cooling function even under solar radiation during the day while sunlight is appropriately reflected by the light reflective layer.

If the protective layer is not provided, there is a risk of the light reflective layer failing to appropriately exhibit its light reflecting function as a result of silver or a silver alloy included in the light reflective layer being discolored in a short period of time due to radicals generated in the resin material layer reaching silver or the silver alloy included in the light reflective layer or moisture that has permeated through the resin material layer reaching silver or the silver alloy included in the light reflective layer. However, when the protective layer is provided, it is possible to keep silver or the silver alloy included in the light reflective layer from being discolored in a short period of time.

The following is an additional description of suppression of discoloration of silver or a silver alloy included in the light reflective layer by the protective layer.

In the case where the protective layer is formed from a polyolefin resin with a thickness of 300 nm or more and 40 μm or less, the protective layer is unlikely to deteriorate by absorbing ultraviolet rays because the polyolefin resin is a synthetic resin that has an absorptivity of 10% or less for ultraviolet rays over the entire wavelength range of ultraviolet rays from 0.3 μm to 0.4 μm.

Moreover, since the thickness of the polyolefin resin forming the protective layer is 300 nm or more, the protective layer favorably exhibits a blocking function of blocking radicals generated in the resin material layer to keep the radicals from reaching silver or the silver alloy included in the light reflective layer and blocking moisture that has permeated through the resin material layer to keep the moisture from reaching silver or the silver alloy included in the light reflective layer, and thus discoloration of silver or the silver alloy included in the light reflective layer can be suppressed.

That is, the protective layer formed from the polyolefin resin deteriorates by absorbing ultraviolet rays while forming radicals on the side of its surface apart from the light reflective layer, but the generated radicals do not reach the light reflective layer because the protective layer has a thickness of 300 nm or more. Also, although the protective layer deteriorates while forming radicals, the progress of deterioration is slow because absorption of ultraviolet rays is low, and therefore, the protective layer exhibits the above-described blocking function for a long period of time.

In the case where the protective layer is formed from an ethylene terephthalate resin with a thickness of 17 μm or more and 40 μm or less, the ethylene terephthalate resin is a resin material that has a higher absorptivity for ultraviolet rays than the polyolefin resin in the wavelength range of ultraviolet rays from 0.3 μm to 0.4 μm. However, the protective layer has a thickness of 17 μm or more, and accordingly, the protective layer favorably exhibits the blocking function of blocking radicals generated in the resin material layer to keep the radicals from reaching silver or the silver alloy included in the light reflective layer and blocking moisture that has permeated through the resin material layer to keep the moisture from reaching silver or the silver alloy included in the light reflective layer for a long period of time, and thus discoloration of silver or the silver alloy included in the protective layer can be suppressed.

That is, the protective layer formed from the ethylene terephthalate resin deteriorates by absorbing ultraviolet rays while forming radicals on the side of its surface apart from the light reflective layer, but the generated radicals do not reach the light reflective layer because the protective layer has a thickness of 17 μm or more. Also, although the protective layer deteriorates while forming radicals, the protective layer exhibits the blocking function for a long period of time because the thickness is 17 μm or more.

Note that the upper limit value of the thickness of the protective layer is set for the cases where the protective layer is formed from the polyolefin resin or the ethylene terephthalate resin in order to avoid a situation in which the protective layer exhibits thermal insulation properties, which do not contribute to radiative cooling, as far as possible. That is, as the thickness of the protective layer is increased, the protective layer exhibits thermal insulation properties, which do not contribute to radiative cooling, and therefore, the upper limit value of the thickness is set to prevent the protective layer from exhibiting thermal insulation properties, which do not contribute to radiative cooling, as far as possible while allowing the protective layer to exhibit the function of protecting the light reflective layer.

In short, with the above-described characteristic configuration of the radiative cooling device according to the present invention, it is possible to favorably cool a cooling target while suppressing discoloration of silver or a silver alloy included in the light reflective layer in a short period of time.

In a characteristic configuration of the radiative cooling device according to the present invention, the resin material layer, the protective layer, and the light reflective layer are stacked on one another in a form of a film.

That is, the resin material layer, the protective layer, and the light reflective layer are stacked on one another in the form of a film. That is, the radiative cooling device formed by stacking the resin material layer, the protective layer, and the light reflective layer is produced as a radiative cooling film.

The resin material layer and the protective layer are flexible, and accordingly, when the light reflective layer is formed as a thin film so as to be flexible, the radiative cooling device (radiative cooling film) has flexibility.

Therefore, it is possible to favorably impart radiative cooling properties to external walls or the like of existing outdoor facilities through post attachment of the film-shaped radiative cooling device (radiative cooling film) having flexibility.

Various forms are conceivable to make the radiative cooling device (radiative cooling film) in the form of a film. For example, it is conceivable to apply the protective layer and the resin material layer to the light reflective layer formed in a film shape. Alternatively, it is conceivable to attach the protective layer and the resin material layer to the light reflective layer formed in a film shape. Alternatively, it is conceivable to apply or attach the protective layer to the resin material layer formed in a film shape, and form the light reflective layer on the protective layer through vapor deposition, sputtering, ion plating, a silver mirror reaction, or the like.

In short, with the above-described characteristic configuration of the radiative cooling device according to the present invention, it is possible to favorably impart radiative cooling properties to existing facilities through post attachment of the radiative cooling device.

In a characteristic configuration of the radiative cooling device according to the present invention, the resin material layer is joined to the protective layer via a joining layer including an adhesive agent or a pressure-sensitive adhesive agent.

That is, the resin material layer is joined to the protective layer via the joining layer formed from an adhesive agent or a pressure-sensitive adhesive agent, and accordingly, it is possible to favorably obtain the state where the resin material layer, the protective layer, and the light reflective layer are stacked on one another by forming the light reflective layer and the protective layer in a layered manner and joining the resin material layer, which has been separately formed, to the protective layer with use of the joining layer.

In the case where the joining layer is provided between the resin material layer and the protective layer, radicals are generated in the joining layer as well, but the protective layer keeps the radicals generated in the joining layer from reaching the light reflective layer for a long period of time in the case where the protective layer is formed from a polyolefin resin with a thickness of 300 nm or more or an ethylene terephthalate resin with a thickness of 17 μm or more.

In a characteristic configuration of the radiative cooling device according to the present invention, the resin material layer includes a filler made of an inorganic material.

That is, it is possible to provide the resin material layer with a light scattering configuration by mixing the filler made of an inorganic material in the resin material layer.

When the radiative surface is seen, glare on the radiative surface can be suppressed by the light scattering configuration.

Inorganic materials such as silicon dioxide ($SiO_2$), titanium oxide ($TiO_2$), aluminum oxide ($Al_2O_3$), and magnesium oxide (MgO) can be preferably used as the filler. When the filler is mixed in the resin material layer, irregularities are formed in both front and rear surfaces of the resin material layer.

Since the joining layer is disposed between the resin material layer and the protective layer, the resin material layer can be joined to the protective layer appropriately by the joining layer even if irregularities are formed in the rear surface of the resin material layer.

In short, with the above-described characteristic configuration of the radiative cooling device according to the present invention, it is possible to suppress glare on the radiative surface.

In a characteristic configuration of the radiative cooling device according to the present invention, front and rear surfaces of the resin material layer have irregularities.

That is, it is possible to provide the resin material layer with a light scattering configuration by forming irregularities in the front and rear surfaces of the resin material layer.

When the radiative surface is seen, glare on the radiative surface can be suppressed by the light scattering configuration.

Irregularities can be formed in both of the front and rear surfaces of the resin material layer through embossing processing, processing for scratching the surfaces, or the like.

Since the joining layer is disposed between the resin material layer and the protective layer, the resin material layer can be joined to the protective layer appropriately by the joining layer even if irregularities are formed in the rear surface of the resin material layer.

In short, with the above-described characteristic configuration of the radiative cooling device according to the present invention, it is possible to suppress glare on the radiative surface.

DESCRIPTION OF THE INVENTION

The following describes an embodiment of the present invention based on the drawings.

[Basic Configuration of Radiative Cooling Device]

Figure 1:
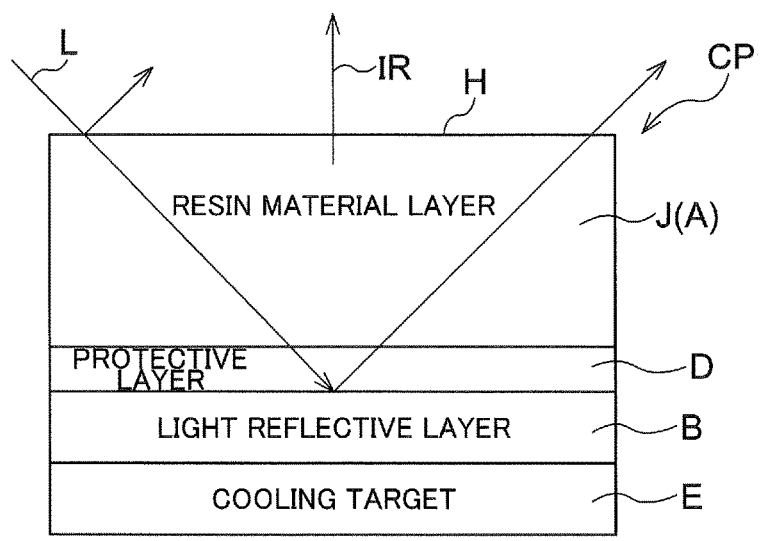
FIG. 1 is a diagram showing a basic configuration of a radiative cooling device

As shown in FIG. 1, a radiative cooling device CP includes: an infrared radiative layer A having a radiative surface H for radiating infrared light IR; a light reflective layer B on a side of the infrared radiative layer A, which is the side opposite to the radiative surface H; and a protective layer D between the infrared radiative layer A and the light reflective layer B. The radiative cooling device CP is in the form of a film obtained by stacking the infrared radiative layer A, the light reflective layer B, and the protective layer D on one another.

That is, the radiative cooling device CP is configured as a radiative cooling film.

The light reflective layer B reflects light L, such as sunlight, that has passed through the infrared radiative layer A and the protective layer D. The light reflective layer B has reflective properties that allow for a reflectance of 90% or more in a wavelength range from 0.4 µm to 0.5 µm and a reflectance of 96% or more for light having a wavelength longer than 0.5 µm.

The spectrum of sunlight spans from a wavelength of 0.295 µm (295 nm) to a wavelength of 4 µm (4000 nm), and the intensity increases as the wavelength increases from 0.4 µm (400 nm), and the intensity is particularly high in a wavelength range from 0.5 µm (500 nm) to 1.8 µm (1800 nm).

In the present embodiment, light L encompasses ultraviolet light (ultraviolet rays), visible light, and infrared light. When these are described in terms of the wavelength of light, which is electromagnetic waves, the light L encompasses electromagnetic waves having wavelengths of 10 nm to 20000 nm (electromagnetic waves having wavelengths of 0.01 µm to 20 µm). In the present specification, the wavelength range of ultraviolet light (ultraviolet rays) is taken as a range from 295 nm (0.295 µm) to 400 nm (0.4 µm).

Since the light reflective layer B exhibits the reflective properties that allow for a reflectance of 90% or more in the wavelength range from 0.4 µm to 0.5 µm and a reflectance of 96% or more for light having a wavelength longer than 0.5 µm, solar energy absorbed by the light reflective layer B of the radiative cooling device CP (radiative cooling film) can be suppressed to 5% or less. That is, solar energy absorbed at the time of meridian transit in summer can be suppressed to about 50 W.

The light reflective layer B is constituted by silver or a silver alloy or has a layered structure constituted by (i) silver or a silver alloy adjacent to the protective layer D and (ii) aluminum or an aluminum alloy apart from the protective layer D (in other words, a layered structure including (i) silver or a silver alloy on a side close to the resin material layer J and (ii) aluminum or an aluminum alloy on a side apart from the resin material layer J). The light reflective layer B is flexible. Details of the light reflective layer B will be described later.

The infrared radiative layer A is configured as the resin material layer J that has a thickness adjusted so that the resin material layer J emits heat radiation energy greater than absorbed solar energy in the wavelength range from 8 µm to 14 µm.

Although details of the resin material layer J will be described later, the resin material layer J in the present embodiment is formed from a resin material that is a vinyl chloride resin in which a plasticizer is mixed. Note that the resin material layer J may also be formed from a vinylidene chloride resin in which a plasticizer is mixed.

Accordingly, the radiative cooling device CP is configured such that the radiative surface H of the infrared radiative layer A reflects a portion of light L incident on the radiative cooling device CP and the light reflective layer B reflects a portion (e.g., sunlight) of light L incident on the radiative cooling device CP and transmitted through the resin material layer J and the protective layer D so that the reflected light goes out from the radiative surface H to the outside.

The radiative cooling device CP is also configured to cool a cooling target E on a side of the light reflective layer B, which is the side opposite to the resin material layer J, by converting heat input from the cooling target E (e.g., heat conducted from the cooling target E) to the radiative cooling device CP to infrared light IR in the resin material layer J and radiating the infrared light IR from the resin material layer J.

That is, the radiative cooling device CP is configured to reflect light L emitted toward the radiative cooling device CP and radiate heat conducted to the radiative cooling device CP (e.g., heat conducted from the atmosphere or the cooling target E) as infrared light IR to the outside.

Also, the radiative cooling device CP (radiative cooling film) is configured to be flexible due to the resin material layer J, the protective layer D, and the light reflective layer B being flexible.

In addition, the radiative cooling device CP is used to perform a radiative cooling method of radiating infrared light IR from the radiative surface H, which is opposite to a surface of the resin material layer J in contact with the light reflective layer B. Specifically, the radiative cooling method is performed by directing the radiative surface H skyward to allow infrared light IR to be radiated from the radiative surface H.

[Outline of Resin Material Layer]

The absorptivity and the emissivity (light emissivity) of the resin material (vinyl chloride resin) forming the resin material layer J vary according to the thickness of the resin material layer. Therefore, the thickness of the resin material layer J needs to be adjusted in such a manner that the resin material layer does not absorb sunlight as far as possible and radiates a large amount of heat in the wavelength band of so-called atmospheric window (light wavelength range from 8 μm to 14 μm).

Specifically, from the viewpoint of absorptivity for sunlight, the thickness of the resin material layer J needs to be adjusted in such a manner that a wavelength average absorptivity in a wavelength range from 0.4 μm to 0.5 μm is 13% or less, a wavelength average absorptivity in a wavelength range from 0.5 μm to 0.8 μm is 4% or less, a wavelength average absorptivity in a wavelength range from 0.8 μm to 1.5 μm is 1% or less, a wavelength average absorptivity in a wavelength range from 1.5 μm to 2.5 μm is 40% or less, and a wavelength average absorptivity in a wavelength range from 2.5 μm to 4 μm is 100% or less.

In the case of such an absorptivity distribution, the absorptivity for sunlight is 10% or less, which corresponds to an energy of 100 W or less.

The absorptivity of the resin material increases as the film thickness of the resin material is increased as described later. When the film thickness of the resin material is made large, the emissivity in the atmospheric window becomes approximately 1, and the amount of heat radiated toward the universe at that time is 125 W/m² to 160 W/m². The amount of sunlight absorbed by the protective layer D and the light reflective layer B is 50 W/m² or less. Cooling progresses if the sum of amounts of sunlight absorbed by the resin material layer J, the protective layer D, and the light reflective layer B is 150 W/m² or less and the atmosphere is in good conditions. It is preferable to use a resin material that has a small absorptivity in the vicinity of a peak value of the sunlight spectrum as described above as the resin material of the resin material layer J.

Also, from the viewpoint of infrared radiation (heat radiation), the thickness of the resin material layer J needs to be adjusted in such a manner that a wavelength average emissivity in the wavelength range from 8 μm to 14 μm is 40% or more.

In order to emit heat energy of about 50 W/m² absorbed from sunlight by the protective layer D and the light reflective layer B to the universe from the resin material layer J through heat radiation from the resin material layer J, the resin material layer J needs to radiate heat more than or equal to the absorbed heat.

For example, when the ambient temperature is 30° C., the maximum heat radiation in the atmospheric window of the wavelength range from 8 μm to 14 μm is 200 W/m² (calculated with the emissivity taken as 1). This value can be obtained in an environment in which the air is thin and very dry, such as an environment on a high mountain, in cloudless weather. When compared with a high mountain, the thickness of the atmosphere increases in a lowland, for example, and accordingly, the wavelength band of the atmospheric window becomes narrower and the transmittance decreases. This is said as "the atmospheric window becoming narrower".

Also, the radiative cooling device CP (radiative cooling film) is actually used in a humid environment, and the atmospheric window becomes narrower in such a case as well. When the radiative cooling device is used in a lowland, heat radiation in the atmospheric window band is estimated to be 160 W/m² (calculated with the emissivity taken as 1) at 30° C. under good conditions. Moreover, when there is haze or smog in the sky, as is often the case in Japan, the atmospheric window further becomes narrower and radiation to the universe becomes about 125 W/m².

In view of the foregoing, the radiative cooling device cannot be used in a lowland in the mid-latitude area unless the wavelength average emissivity in the wavelength range from 8 μm to 14 μm is 40% or more (heat radiation intensity in the atmospheric window band is 50 W/m² or more).

Therefore, when the thickness of the resin material layer J is adjusted so as to fall within the range of optical prescriptions defined in view of the above circumstances, the amount of heat output in the atmospheric window becomes greater than the amount of heat input through absorption of sunlight, and the temperature can fall below the ambient temperature through radiative cooling in an outdoor environment even under solar radiation.

In the present embodiment, the resin material layer J formed from the vinyl chloride-based resin has a thickness of 10 μm or more and 100 μm or less.

[Details of Resin Material]

According to Kirchhoff's law, the emissivity (e) is equal to the absorptivity (A). The absorptivity can be calculated from an absorption coefficient (a) and the following expression (1) (hereinafter may be referred to as an absorptivity relational expression).

$$A = 1 - \exp(-\alpha t) \quad (1)$$

Note that t represents the film thickness.

That is, by adjusting the film thickness of the resin material layer J, it is possible to obtain a large amount of heat radiation in a wavelength band in which the absorption coefficient is large. In a case where radiative cooling is performed outdoors, it is preferable to use a material that has a large absorption coefficient in the wavelength band of the atmospheric window, which is from 8 μm to 14 μm.

Also, in order to suppress absorption of sunlight, it is preferable to use a material that does not have an absorption coefficient or has a small absorption coefficient in a wavelength range from 0.3 μm to 4 μm, and particularly from 0.4 μm to 2.5 μm. As can be understood from the relational expression of the absorption coefficient and the absorptivity, the absorptivity (emissivity) varies according to the film thickness of the resin material.

In order to make the temperature lower than the temperature of the surrounding atmosphere through radiative cooling under solar radiation, it is possible to create a state in which almost no sunlight is absorbed but a large amount of heat is radiated in the atmospheric window, i.e., output of radiative cooling is greater than input of sunlight, by selecting a material that has a large absorption coefficient in the wavelength band of the atmospheric window and almost no absorption coefficient in the wavelength band of sunlight and by adjusting the film thickness.

The sunlight spectrum includes only wavelengths longer than or equal to 0.295 μm. Note that ultraviolet rays are defined as light having a wavelength shorter than 0.4 μm, visible rays are defined as light in a wavelength range from 0.4 μm to 0.8 μm, near-infrared rays are defined as light in a wavelength range from 0.8 μm to 3 μm, mid-infrared rays are defined as light in a wavelength range from 3 μm to 8 μm, and far-infrared rays are defined as light having a wavelength longer than 8 μm.

As for a carbon-chlorine bond (C—Cl), bond energy between carbon and chlorine in an alkene is 3.28 eV, which corresponds to a wavelength of 0.378 μm, and therefore, ultraviolet rays in sunlight are absorbed well, but almost no light in the visible range is absorbed.

Figure 2:
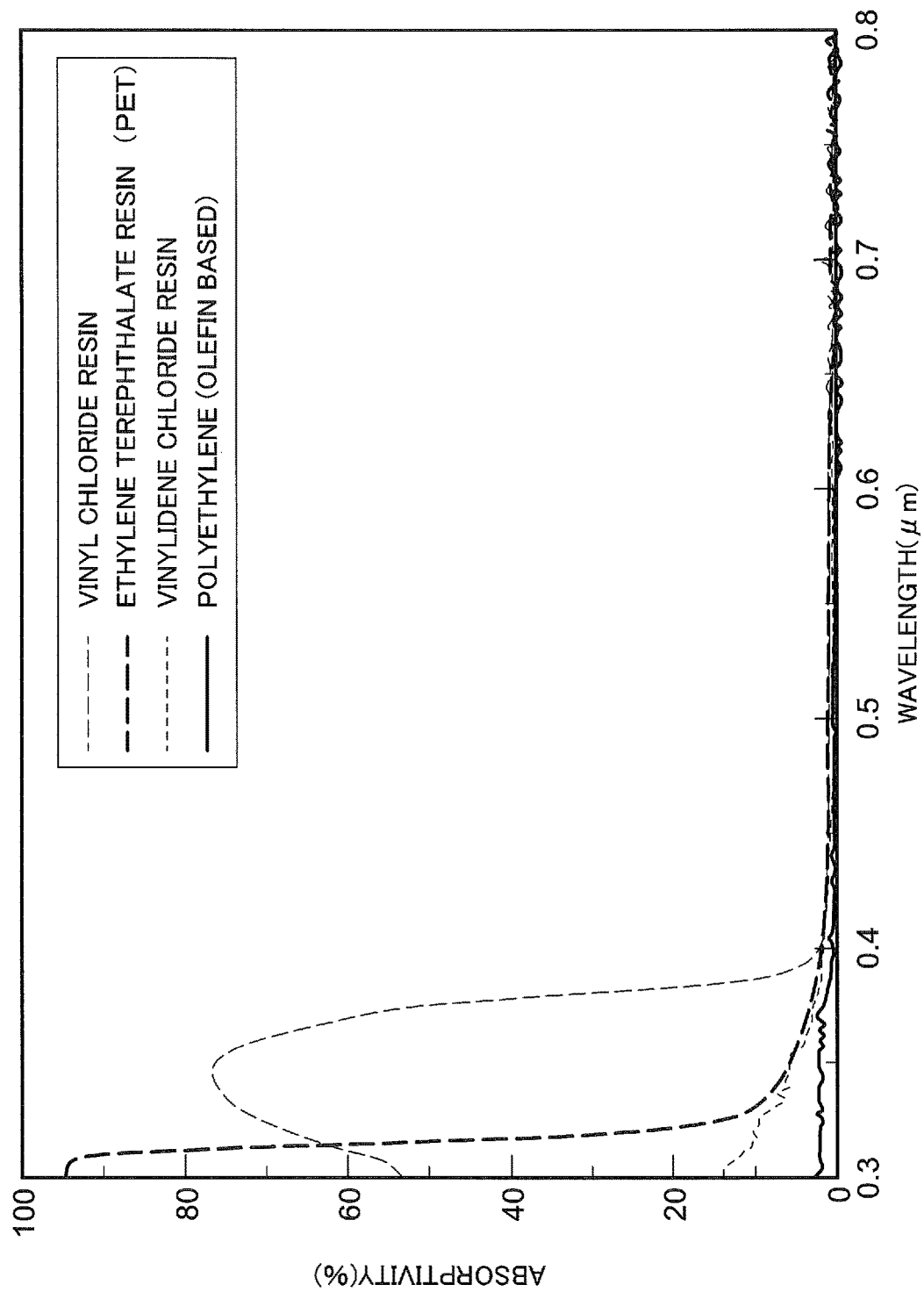
FIG. 2 is a diagram showing a relationship between absorptivities of resin materials and the wavelength.

FIG. 2 shows an absorptivity spectrum of a vinyl chloride resin with a thickness of 100 µm in the ultraviolet-visible range. Light absorption is large at wavelengths shorter than 0.38 µm.

Figure 3:
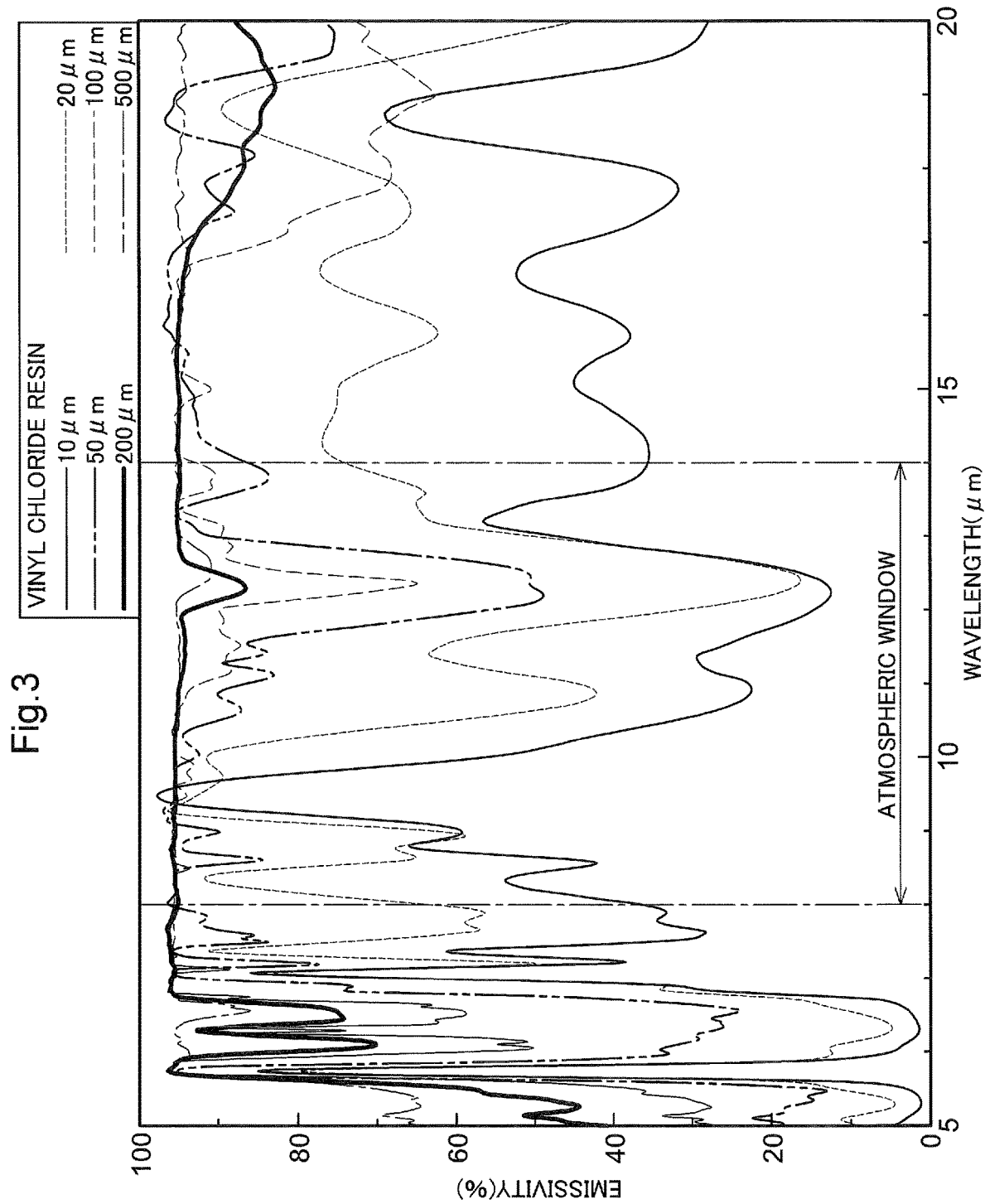
FIG. 3 is a diagram showing an emissivity spectrum of a vinyl chloride resin.

FIG. 3 shows the emissivity of the vinyl chloride resin (PVC), which has a carbon-chlorine bond, in the atmospheric window.

As for the carbon-chlorine bond, an absorption coefficient for stretching vibration of C—Cl appears around a wavelength of 12 µm over a wide range with a half width of 1 µm or more.

Also, in the case of the vinyl chloride resin, an absorption coefficient for bending vibration of C—H in an alkene contained in the main chain appears at a wavelength of about 10 µm under the influence of electron-withdrawing of chlorine.

Under the influence of these, a wavelength average emissivity when the thickness is 10 µm is 43% in the wavelength range from 8 µm to 14 µm and falls within the prescribed range of the wavelength average emissivity of 40% or more. As shown in FIG. 3, the emissivity in the atmospheric window range increases as the film thickness is increased.

Heat radiation in the atmospheric window from the resin material layer J occurs in the vicinity of the surface of the resin material.

As shown in FIG. 3, in the case of the vinyl chloride resin, the amount of heat radiation in the atmospheric window range hardly increases even when the film thickness is increased to more than 100 µm. That is, in the case of the vinyl chloride resin, heat radiation in the atmospheric window occurs in a portion of the resin material that is within a depth of about 100 µm from the surface, and radiation from a deeper portion does not go to the outside.

As described above, heat radiation from a surface of a resin material in the atmospheric window range occurs in a portion of the resin material that is within a depth of about 100 µm from the surface, and when the thickness of the resin material is increased to more than 100 µm, cold heat obtained through radiative cooling performed by the radiative cooling device CP is insulated by a portion of the resin material that does not contribute to heat radiation.

Assume a case where an ideal resin material layer J that does not absorb sunlight at all is formed on the light reflective layer B. In this case, sunlight is only absorbed by the light reflective layer B of the radiative cooling device CP.

Resin materials generally have a thermal conductivity of about 0.2 W/m/K, and when a calculation is performed taking the thermal conductivity into account, the temperature of a cooling surface (a surface of the light reflective layer B, which is opposite to the resin material layer J) increases when the thickness of the resin material layer J is larger than 20 mm.

Even if there is an ideal resin material that does not absorb sunlight at all, the thermal conductivity of a resin material is generally about 0.2 W/m/K, and accordingly, when the thickness of the resin material layer is larger than 20 mm, the light reflective layer B is heated by solar radiation and the cooling target E on the light reflective layer side is heated. That is, the thickness of the resin material in the radiative cooling device CP needs to be 20 mm or less.

[Thickness of Resin Material Layer]

From the viewpoint of practical use of the radiative cooling device CP, the thinner the resin material layer J, the better. The thermal conductivity of a resin material is generally lower than those of metal, glass, and the like. In order to effectively cool the cooling target E, it is preferable that the resin material layer J has the minimum required thickness. Heat radiation in the atmospheric window increases as the film thickness of the resin material layer J is increased, and heat radiation energy in the atmospheric window is saturated when the film thickness exceeds a certain thickness.

Although the film thickness of the resin material layer at which heat radiation energy is saturated varies according to the resin material, in the case of a resin having a carbon-chlorine bond, heat radiation energy is saturated even when the thickness is 100 µm, and sufficient heat radiation can be obtained in the atmospheric window range even when the thickness is 50 µm. The smaller the thickness of the resin material is, the higher the thermal transmittance becomes and the more effectively the temperature of the cooling target can be reduced, and therefore, in the case of a resin having a carbon-chlorine bond, it is possible to suppress thermal insulation properties and effectively cool the cooling target E by setting the thickness to 50 µm or less. In the case of a resin having a carbon-chlorine bond, the cooling target E can be effectively cooled when the thickness is 100 µm or less.

When the thickness is reduced, it is possible to obtain an effect other than the effect of suppressing thermal insulation properties and facilitating conduction of cold heat. That is, it is possible to suppress light absorption by CH, $CH_2$, and $CH_3$ in the near-infrared range, which occurs in the case of a resin having a carbon-chlorine bond. When the thickness is reduced, absorption of sunlight by these can be suppressed and consequently, cooling capability of the radiative cooling device CP is increased.

From the viewpoint described above, in the case of a vinyl chloride-based resin having a carbon-chlorine bond, the radiative cooling effect can be more effectively exhibited under solar radiation when the thickness is 50 µm or less.

[Details of Light Reflective Layer]

In order to make the light reflective layer B have the reflectance characteristics described above, silver or a silver alloy needs to be used as a reflective material on the radiative surface H side (the resin material layer J side).

Figure 4:
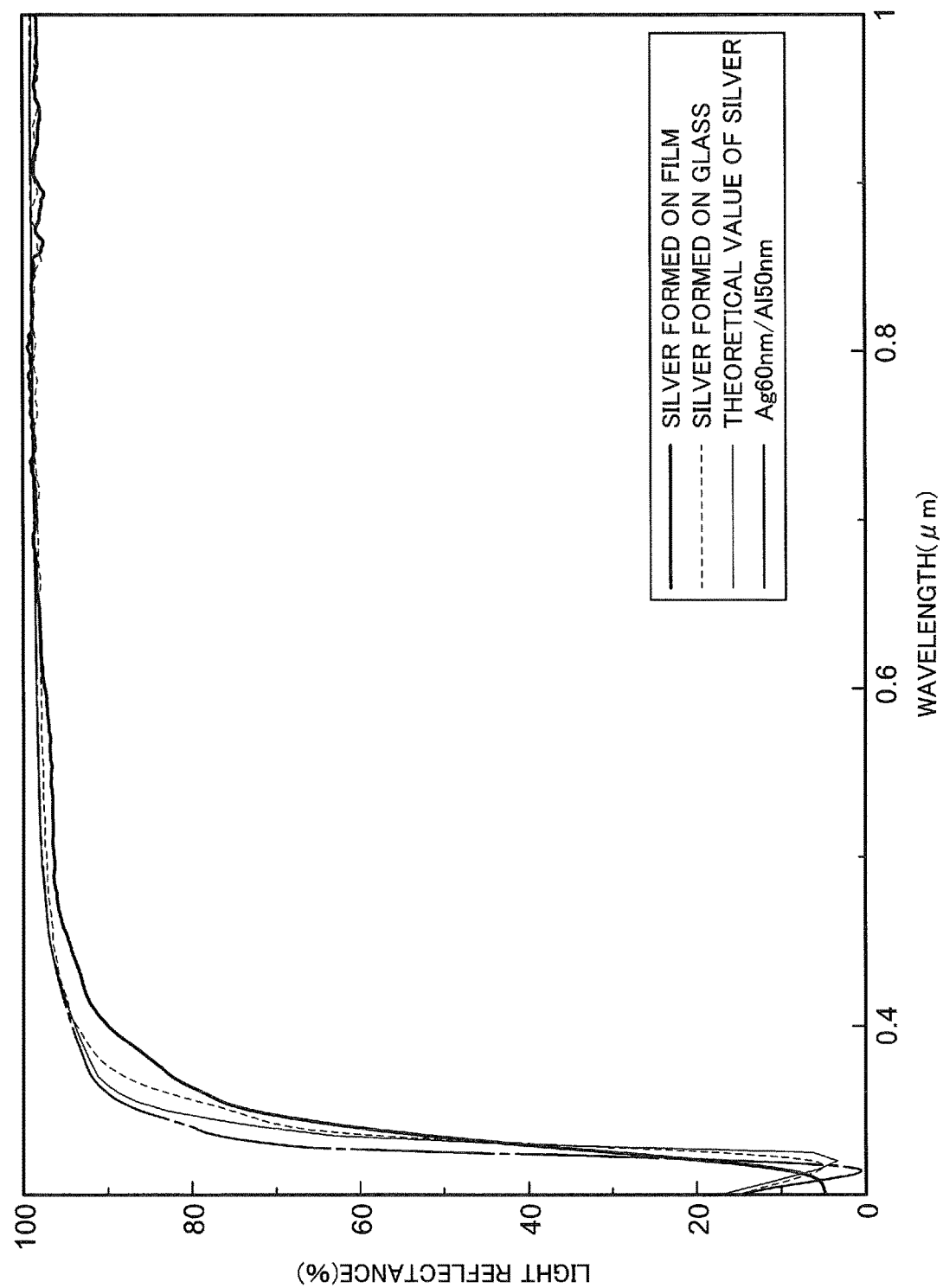
FIG. 4 is a diagram showing a reflectance spectrum of a light reflective layer that contains silver as a base material.

As shown in FIG. 4, when silver is used as a base material of the light reflective layer B, the light reflective layer B can have the required reflectance.

In a case where sunlight is to be reflected only by silver or a silver alloy in such a manner as to satisfy the reflectance characteristics described above, a thickness of 50 nm or more is required.

However, in order to make the light reflective layer B flexible, the thickness needs to be 100 µm or less. If the thickness is larger than 100 µm, the light reflective layer becomes difficult to bend.

It is possible to use, as a silver alloy, an alloy obtained by adding copper, palladium, gold, zinc, tin, magnesium, nickel, or titanium in an amount of about 0.4 mass % to 4.5 mass % to silver, for example. As a specific example, it is possible to use "APC-TR (manufactured by Furuya Metal Co., Ltd.)", which is a silver alloy manufactured by adding copper and palladium to silver.

In order to make the light reflective layer B have the reflectance characteristics described above, it is also possible to adopt a layered structure including (i) silver or a silver alloy adjacent to the protective layer D and (ii) aluminum or an aluminum alloy apart from the protective layer D. In this case as well, it is necessary to use silver or a silver alloy as the reflective material on the radiative surface H side (the resin material layer J side).

In the case where the light reflective layer is constituted by two layers made of silver (silver alloy) and aluminum (aluminum alloy), the thickness of the silver layer needs to be 10 nm or more and the thickness of the aluminum layer needs to be 30 nm or more.

However, in order to make the light reflective layer B flexible, the sum of the thickness of the silver layer and the thickness of the aluminum layer needs to be 100 μm or less. If the sum is larger than 100 μm, the light reflective layer becomes difficult to bend.

It is possible to use, as an aluminum alloy, an alloy obtained by adding copper, manganese, silicon, magnesium, zinc, carbon steel for mechanical structures, yttrium, lanthanum, gadolinium, or terbium to aluminum.

Silver and a silver alloy are weak to rain and moisture and need to be protected from them. Also, discoloration of silver and a silver alloy needs to be suppressed. Therefore, the protective layer D that protects silver needs to be adjacent to silver or a silver alloy as shown in FIGS. 5 to 8.

Details of the protective layer D will be described later.

[Details of Plasticizer]

The plasticizer mixed in the vinyl chloride resin forming the resin material layer J is at least one compound selected from the group consisting of phthalic acid esters, aliphatic dibasic acid esters, and phosphoric acid esters.

The plasticizer is mixed in an amount of 1 part by weight or more and 200 parts by weight or less relative to 100 parts by weight of the vinyl chloride resin.

From the viewpoint of processing, the plasticizer is preferably mixed in an amount of 100 parts by weight or less.

It is preferable to use, as the plasticizer, at least one aliphatic dibasic acid ester selected from the group consisting of adipic acid esters, adipic acid ester copolymers, azelaic acid esters, azelaic acid ester copolymers, sebacic acid esters, sebacic acid ester copolymers, succinic acid esters, and succinic acid ester copolymers.

An aliphatic dibasic acid ester used as the plasticizer is preferably formed through ester bonding between an aliphatic dibasic acid and two molecules of a saturated aliphatic alcohol.

A phthalic acid ester used as the plasticizer is preferably formed through ester bonding between phthalic acid and two molecules of a saturated aliphatic alcohol.

A phosphoric acid ester used as the plasticizer is preferably a phosphoric acid triester or an aromatic phosphoric acid ester.

<Details of Phthalic Acid Esters>

Examples of phthalic acid esters include:
dimethyl phthalate (DMP), diethyl phthalate (DEP), dibutyl phthalate (DPP), di-2-ethylhexyl phthalate (DOP), diisononyl phthalate (DINP), diisodecyl phthalate (DIDP), diundecyl phthalate (DUP), ditridecyl phthalate (DTDP), bis(2-ethylhexyl) terephthalate (DOTP), and bis(2-ethylhexyl) isophthalate (DOIP).

<Details of Aliphatic Dibasic Acid Esters>

Examples of aliphatic dibasic acid esters include:
dibutyl adipate (DBA), diisobutyl adipate (DIBA), di-2-ethylhexyl adipate (DOA), diisononyl adipate (DINA), diisodecyl adipate (DIDA), bis-2-ethylhexyl azelate (DOZ), dibutyl sebacate (DBS), di-2-ethylhexyl sebacate (DOS), diisononyl sebacate (DINS), and diethyl succinate (DESU).

Examples of aliphatic dibasic acid esters also include an aliphatic polyester having a molecular weight of 400 to 4000 and synthesized through copolymerization (polyesterification) between a dibasic acid such as adipic acid and a diol (difunctional alcohol or glycol).

<Phosphoric Acid Triester>

Examples of phosphoric acid triesters include:
trimethyl phosphate (TMP), triethyl phosphate (TEP), tributyl phosphate (TBP), and tris(2-ethylhexyl) phosphate (TOP).

<Aromatic Phosphoric Acid Ester>

Examples of aromatic phosphoric acid esters include:
triphenyl phosphate (TPP), tricresyl phosphate (TCP), trixylenyl phosphate (TXP), cresyl diphenyl phosphate (CDP), and 2-ethylhexyldiphenyl phosphate.

<Evaluation of Suitable Plasticizer>

Plasticizers used for a vinyl chloride resin include phthalic acid esters, aliphatic dibasic acid esters, phosphoric acid triesters, aromatic phosphoric acid esters, trimellitic acid esters, and epoxidized aliphatic acid esters. Compounds listed below were selected from these plasticizers, and 43 parts by weight of each plasticizer was mixed relative to 100 parts by weight of a vinyl chloride resin and evaluated through a xenon weather test.

Note that 0.5 parts by weight of a triazine-based ultraviolet absorbing agent and 0.5 parts by weight of a hindered amine photostabilizer were kneaded with 100 parts by weight of the vinyl chloride resin.

Di-2-ethylhexyl phthalate (DOP) and diisodecyl phthalate (DIDP) were selected as representative examples of phthalic acid esters.

Di-2-ethylhexyl adipate (DOA), a butanediol adipate copolymer (average molecular weight: about 1000), and diisononyl adipate (DINA) were selected as representative examples of aliphatic dibasic acid esters.

Tributyl phosphate (TBP) was selected as a representative example of phosphoric acid triesters.

Tricresyl phosphate (TCP) was selected as a representative example of aromatic phosphoric acid esters.

Tris(2-ethylhexyl) trimellitate (TOTM) was selected as a representative example of trimellitic acid esters.

Epoxidized soybean oil was selected as a representative example of epoxidized aliphatic acid esters.

Durability was evaluated based on results of a durability test in which a xenon weather test was performed for 1920 hours (corresponding to 4 years of outdoor exposure). Note that 487 hours correspond to one year in terms of ultraviolet rays.

The xenon weather test was performed under the following conditions.

UV intensity: 180 W/m$^2$ (wavelength: 295 to 400 nm)

<Conditions without water sprinkling> BPT: 89° C., humidity: 50%, 1 hour and 42 minutes.

<Conditions with water sprinkling> temperature in the chamber: 38° C., humidity: 90%, 18 minutes.

Figure 14:
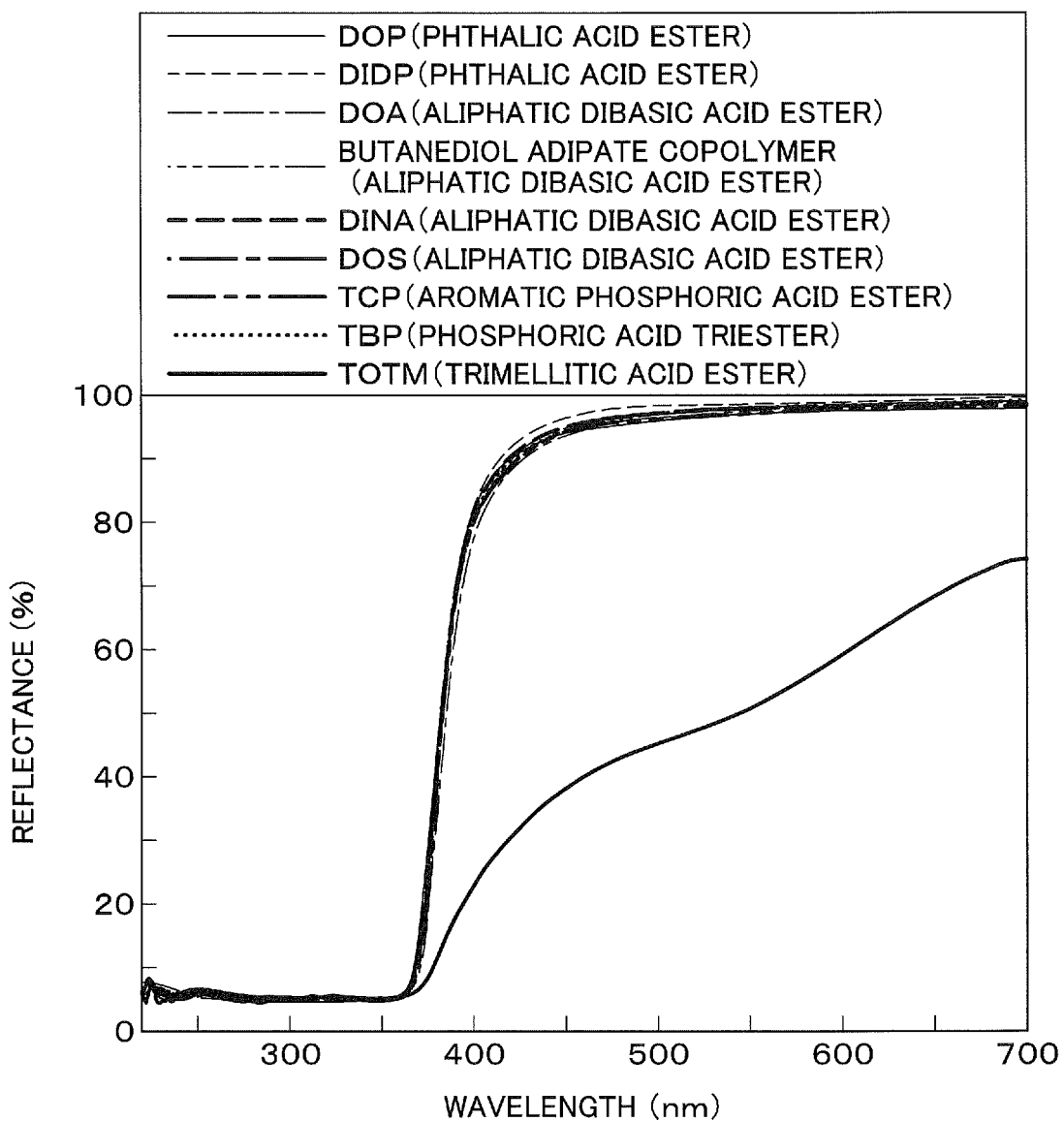
FIG. 14 is a diagram showing a test result of cases where plasticizers were mixed in a vinyl chloride resin.

FIG. 14 shows results of the test carried out for 1920 hours. Note that a vinyl chloride resin was used for the experiment in the present embodiment, but similar results can be obtained for a vinylidene chloride resin as well.

Through the experiment described above, it was found that durability significantly decreased in the cases where a trimellitic acid ester (TOTM) and an epoxidized aliphatic acid ester (epoxidized soybean oil) were used as plasticizers. Note that the result of the epoxidized aliphatic acid ester is not shown in FIG. 14 because discoloration to brown occurred once 1120 hours had elapsed and the test could not be continued.

On the other hand, it was found that when phthalic acid esters, aliphatic dibasic acid esters, phosphoric acid triesters, and aromatic phosphoric acid esters are used, the radiative cooling device CP can be sufficiently durable to be used for about 4 years. That is, it was found that when phthalic acid esters, aliphatic dibasic acid esters, phosphoric acid triesters, and aromatic phosphoric acid esters are used as plasticizers mixed with the vinyl chloride resin, the reflectance of the radiative cooling device CP does not decrease even when about 4 years elapses, but when trimellitic acid esters and epoxidized aliphatic acid esters are used as plasticizers mixed with the vinyl chloride-based resin, the reflectance of the radiative cooling device CP significantly decreases before about 4 years elapses.

The test results described above show that excellent durability can be obtained with use of phthalic acid esters, aliphatic dibasic acid esters, phosphoric acid triesters, and aromatic phosphoric acid esters as plasticizers for the vinyl chloride-based resin, but sufficient durability cannot be obtained with use of trimellitic acid esters and epoxidized aliphatic acid esters.

Reasons for this will be considered later.

[Other Additives]

A flame retardant, a stabilizer, an auxiliary stabilizer, a filler, an antioxidant, an ultraviolet absorbing agent, and a photostabilizer may be added to the vinyl chloride resin forming the resin material layer J.

<Flame Retardant>

Examples of the flame retardant include: an inorganic compound such as aluminum hydroxide, antimony trioxide, magnesium hydroxide, or zinc borate; a phosphorus-based compound such as cresyl diphenyl phosphate, tris chloroethyl phosphate, tris chloropropyl phosphate, or tris dichloropropyl phosphate; and a halogen-based compound such as chlorinated paraffin. The amount of flame retardant relative to 100 parts by weight of the vinyl chloride resin is about 0.1 to 20 parts by weight.

<Stabilizer>

Examples of the stabilizer include: a metal soap compound such as lithium stearate, magnesium stearate, magnesium laurate, calcium ricinoleate, calcium stearate, barium laurate, barium ricinoleate, barium stearate, zinc octylate, zinc laurate, zinc ricinoleate, or zinc stearate; an organotin-based compound such as dimethyltin bis-2-ethylhexyl thioglycolate, dibutyltin maleate, dibutyltin bis butyl maleate, or dibutyltin dilaurate; and an antimony mercaptide compound. The amount of stabilizer relative to 100 parts by weight of the vinyl chloride resin is about 0.1 to 20 parts by weight.

<Auxiliary Stabilizer>

Examples of the auxiliary stabilizer include: a phosphite-based compound such as triphenyl phosphite, monooctyl diphenyl phosphite, or tridecyl phosphite; a beta-diketone compound such as acetylacetone or benzoylacetone; a polyol compound such as glycerin, sorbitol, pentaerythritol, or polyethylene glycol; a perchlorate compound such as a perchloric acid barium salt or a perchloric acid sodium salt; a hydrotalcite compound; and zeolite. The amount of auxiliary stabilizer relative to 100 parts by weight of the vinyl chloride resin is about 0.1 to 20 parts by weight.

<Filler>

Examples of the filler include: a metal oxide such as calcium carbonate, silica, alumina, clay, talc, diatomaceous earth, or ferrite; a fiber and powder of glass, carbon, or metal; glass spheres, graphite, aluminum hydroxide, barium sulfate, magnesium oxide, magnesium carbonate, magnesium silicate, and calcium silicate. The amount of filler relative to 100 parts by weight of the vinyl chloride resin is about 1 to 100 parts by weight.

<Antioxidant>

Examples of the antioxidant include: a phenolic compound such as 2,6-di-tert-butylphenol, tetrakis[methylene-3-(3,5-tert-butyl-4-hydroxyphenol) propionate] methane, or 2-hydroxy-4-methoxybenzophenone; a sulfur-based compound such as an alkyl disulfide, a thiodipropionic acid ester, or benzothiazole; a phosphoric acid-based compound such as tris nonylphenyl phosphite, diphenyl isodecyl phosphite, triphenyl phosphite, or tris(2,4-di-tert-butylphenyl) phosphite; and an organic metal-based compound such as zinc dialkyl dithiophosphate or zinc diaryl dithiophosphate. The amount of antioxidant relative to 100 parts by weight of the vinyl chloride resin is about 0.2 to 20 parts by weight.

<Ultraviolet Absorbing Agent>

Examples of the ultraviolet absorbing agent include: a salicylate compound such as phenyl salicylate or p-tert-butylphenyl salicylate; a benzophenone compound such as 2-hydroxy-4-n-octoxybenzophenone or 2-hydroxy-4-n-methoxybenzophenone; a benzotriazole compound such as 5-methyl-1H-benzotriazole or 1-dioctylaminomethylbenzotriazole; a cyanoacrylate compound; and a triazine compound. The amount of ultraviolet absorbing agent relative to 100 parts by weight of the vinyl chloride resin is about 0.1 to 10 parts by weight.

<Photostabilizer>

Examples of the photostabilizer include bis(2,2,6,6-tetramethyl-4-piperidyl) sebacate, bis(1,2,2,6,6-pentamethyl-4-piperidyl) sebacate, and methyl 1,2,2,6,6-pentamethyl-4-piperidyl sebacate (mixture), bis(1,2,2,6,6-pentamethyl-4-piperidyl)[[3,5-bis(1,1-dimethylethyl)-4-hydroxyphenyl]methyl]butyl malonate, decanedioic acid bis(2,2,6,6-tetramethyl-1(octyloxy)-4-piperidyl) ester, a reaction product of 1,1-dimethyl ethyl hydroperoxide and octane, 4-benzoyloxy-2,2,6,6-tetramethylpiperidine, an ester mixture of 2,2,6,6-tetramethyl-4-piperidinol and a higher fatty acid, tetrakis(2,2,6,6-tetramethyl-4-piperidyl)-1,2,3,4-tetrakis(1,2,2,6,6-pentamethyl-4-piperidyl)-1,2,3,4-butanetetracarboxylate, butanetetracarboxylate, a polycondensate of dimethyl succinate and 4-hydroxy-2,2,6,6-tetramethyl-1-piperidineethanol, poly[{(6-(1,1,3,3-tetramethylbutyl)amino-1,3,5-triazine-2,4-diyl}{(2,2,6,6-tetramethyl-4-piperidyl)imino} hexamethylene{(2,2,6,6-tetramethyl-4-piperidyl)imino}], a polycondensate of dibutylamine-1,3,5-triazine N,N'-bis(2,2,6,6-tetramethyl-4-piperidyl-1,6-hexamethylenediamine and N-(2,2,6,6-tetramethyl-4-piperidyl) butylamine, and a hindered amine such as N,N',N'',N'''-tetrakis-(4,6-bis-(butyl-(N-methyl-2,2,6,6-tetramethylpiperidine-4-yl)amino)-triazine-2-yl)-4,7-diazadecane-1,10-diamine. The amount of photostabilizer relative to 100 parts by weight of the vinyl chloride-based resin is about 0.1 to 10 parts by weight.

[Specific Configuration of Radiative Cooling Device]

As shown in FIGS. 5 to 8, the radiative cooling device CP according to the present invention can be made so as to have a film structure. Resin materials forming the resin material layer J and the protective layer D are flexible, and accordingly, when the light reflective layer B is formed as a thin film, the light reflective layer B can be made flexible as well, and consequently the radiative cooling device CP can be made as a flexible film (radiative cooling film).

The film-shaped radiative cooling device CP (radiative cooling film) can be wrapped around an outer circumferential surface of an automobile, an external wall of a warehouse or a building, or an outer circumferential surface of a helmet with use of an adhesive, for example. Thus, it is possible to easily make the radiative cooling device CP exhibit its radiative cooling capability through post attachment of the radiative cooling device CP to an existing object.

The film-shaped radiative cooling device CP (radiative cooling film) can be attached to various objects that need to be cooled, such as outer surfaces of various tents, an outer surface of a box for housing electrical equipment or the like, an outer surface of a container used for goods transportation, an outer surface of a milk tank for storing milk, and an outer surface of a milk storage portion of a milk tank lorry.

Various forms are conceivable to make the radiative cooling device CP in the form of a film. For example, it is conceivable to apply the protective layer D and the resin material layer J to the light reflective layer B formed in a film shape. Alternatively, it is conceivable to attach the protective layer D and the resin material layer J to the light reflective layer B formed in a film shape. Alternatively, it is conceivable to apply or attach the protective layer D to the resin material layer J formed in a film shape, and form the light reflective layer B on the protective layer D through vapor deposition, sputtering, ion plating, a silver mirror reaction, or the like.

Figure 5:
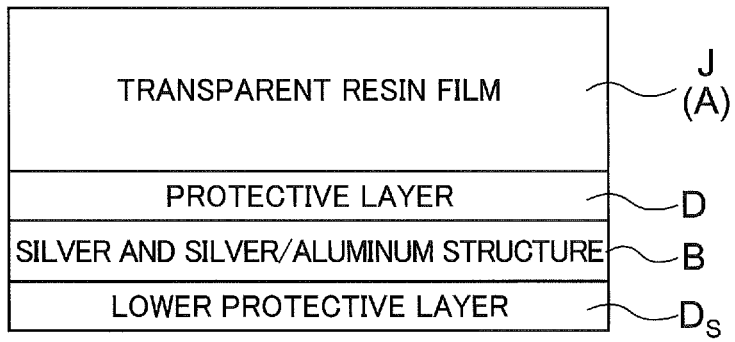
FIG. 5 is a diagram showing a specific configuration of the radiative cooling device.

More specifically, a radiative cooling device CP (radiative cooling film) shown in FIG. 5 is obtained by forming the protective layer D on the upper side of the light reflective layer B, and forming the resin material layer J on the protective layer D in a case where the light reflective layer B is constituted by a single layer of silver or a silver alloy or two layers respectively made of silver (silver alloy) and aluminum (aluminum alloy). Note that a lower protective layer Ds is also formed on the lower side of the light reflective layer B.

As a method for producing the radiative cooling device CP (radiative cooling film) shown in FIG. 5, it is possible to use a method of applying the protective layer D, the light reflective layer B, and the lower protective layer Ds in this order onto the film-shaped resin material layer J to form these layers into a single piece.

Figure 6:
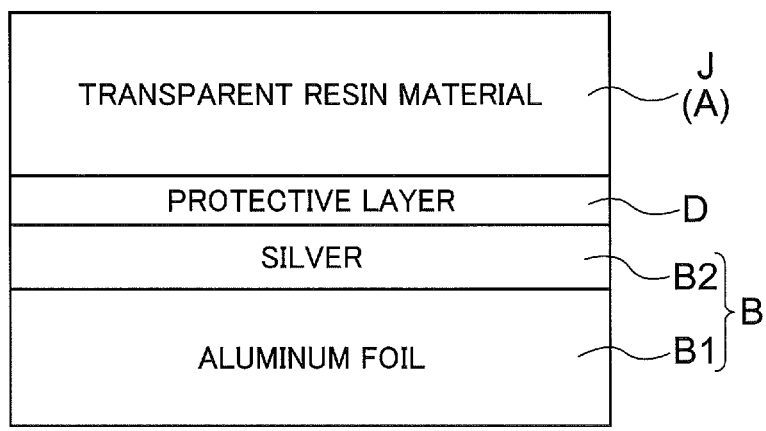
FIG. 6 is a diagram showing a specific configuration of the radiative cooling device.

A radiative cooling device CP (radiative cooling film) shown in FIG. 6 is obtained by forming the protective layer D on the upper side of the light reflective layer B, and forming the resin material layer J on the protective layer D in a case where the light reflective layer B is constituted by (i) an aluminum layer B1 formed from an aluminum foil that functions as aluminum (an aluminum alloy) and (ii) a silver layer B2 made of silver or a silver alloy.

As a method for producing the radiative cooling device CP (radiative cooling film) shown in FIG. 6, it is possible to use a method of applying the silver layer B2, the protective layer D, and the resin material layer J in this order onto the aluminum layer B1 formed from an aluminum foil to form these layers into a single piece.

It is also possible to use another method of forming the resin material layer J in a film shape, applying the protective layer D and the silver layer B2 in this order on the film-shaped resin material layer J, and attaching the aluminum layer B1 to the silver layer B2.

Figure 7:
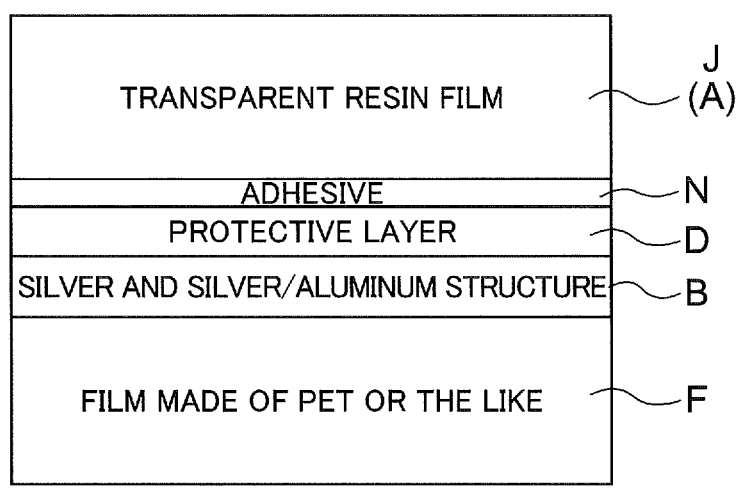
FIG. 7 is a diagram showing a specific configuration of the radiative cooling device.

A radiative cooling device CP (radiative cooling film) shown in FIG. 7 is obtained by forming the protective layer D on the upper side of the light reflective layer B, forming the resin material layer J on the protective layer D, and forming a film layer F made of PET or the like on the lower side of the light reflective layer B in a case where the light reflective layer B is constituted by a single layer made of silver or a silver alloy or two layers respectively made of silver (silver alloy) and aluminum (aluminum alloy).

As a method for producing the radiative cooling device CP (radiative cooling film) shown in FIG. 7, it is possible to use a method of applying the light reflective layer B and the protective layer D in this order onto the film layer F (corresponding to a substrate) formed in a film shape from PET (ethylene terephthalate resin) or the like to form these layers into a single piece and joining (attaching) the film-shaped resin material layer J, which has been separately formed, to the acetyloxy protective layer D with use of an adhesive layer N (an example of a joining layer).

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent to sunlight.

Figure 8:
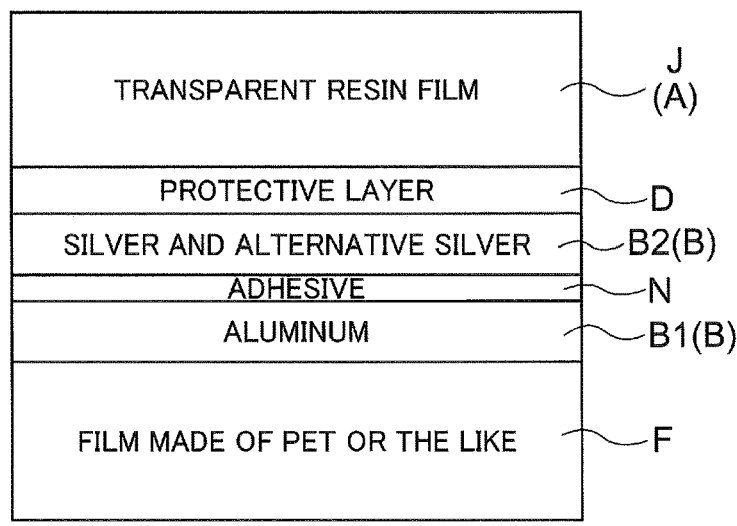
FIG. 8 is a diagram showing a specific configuration of the radiative cooling device.

A radiative cooling device CP (radiative cooling film) shown in FIG. 8 is obtained by forming the light reflective layer B that is constituted by (i) an aluminum layer B1 functioning as aluminum (aluminum alloy) and (ii) a silver layer B2 made of silver or a silver alloy (alternative silver) on a film layer F (corresponding to a substrate) formed in a film shape from PET (ethylene terephthalate resin) or the like in such a manner that the aluminum layer B1 is on the film layer F, and forming the protective layer D on the upper side of the silver layer B2, and forming the resin material layer J on the protective layer D.

As a method for producing the radiative cooling device CP (radiative cooling film) shown in FIG. 8, it is possible to use a method of applying the aluminum layer B1 to the film layer F to form the film layer F and the aluminum layer B1 as a single piece, applying the protective layer D and the silver layer B2 to the film-shaped resin material layer J to form the resin material layer J, the protective layer D, and the silver layer B2 as a single piece, and joining the aluminum layer B1 to the silver layer B2 with use of an adhesive layer N.

Examples of adhesive agents (pressure-sensitive adhesive agents) that can be used for the adhesive layer N include a urethane adhesive agent (pressure-sensitive adhesive agent), an acrylic adhesive agent (pressure-sensitive adhesive agent), and an EVA (ethylene vinyl acetate) adhesive agent (pressure-sensitive adhesive agent), and it is desirable to use an adhesive agent (pressure-sensitive adhesive agent) that is highly transparent to sunlight.

[Details of Protective Layer]

The protective layer D is formed from a polyolefin resin with a thickness of 300 nm or more and 40 μm or less or polyethylene terephthalate with a thickness of 17 μm or more and 40 μm or less.

Examples of the polyolefin resin include polyethylene and polypropylene.

FIG. 2 shows absorptivities for ultraviolet rays of polyethylene, a vinylidene chloride resin, an ethylene terephthalate resin, and a vinyl chloride resin.

Figure 9:
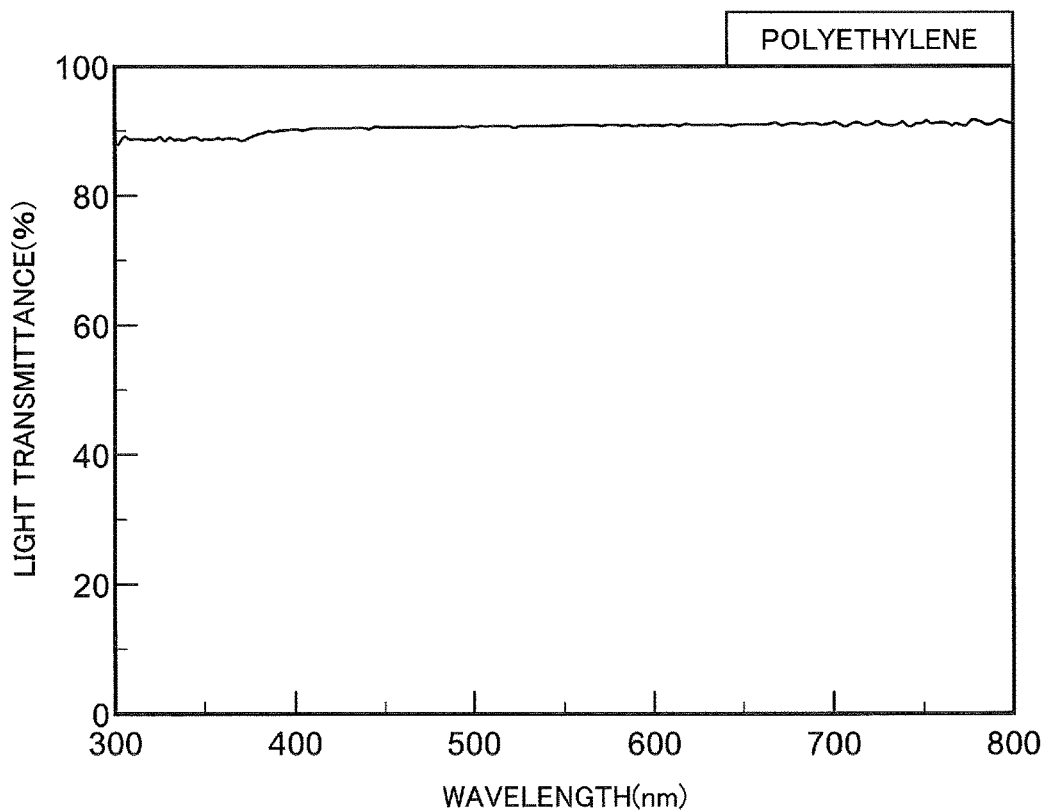
FIG. 9 is a diagram showing a relationship between the light transmittance of polyethylene and the wavelength.

Also, FIG. 9 shows the light transmittance of polyethylene, which is preferably used as a synthetic resin to form the protective layer D.

The radiative cooling device CP (radiative cooling film) exhibits the radiative cooling effect not only at night but also under solar radiation. Accordingly, in order to maintain the state where the light reflective layer B exhibits its light reflecting function, it is necessary to prevent discoloration of silver constituting the light reflective layer B under solar radiation by protecting the light reflective layer B with the protective layer D.

In the case where the protective layer D is formed from a polyolefin resin with a thickness of 300 nm or more and 40 μm or less, the protective layer D is unlikely to deteriorate by absorbing ultraviolet rays because the polyolefin resin is a synthetic resin that has an absorptivity of 10% or less for ultraviolet rays over the entire wavelength range of ultraviolet rays from 0.3 µm to 0.4 µm.

Moreover, since the thickness of the polyolefin resin forming the protective layer D is 300 nm or more, the protective layer D favorably exhibits a blocking function of blocking radicals generated in the resin material layer J to keep the radicals from reaching silver or a silver alloy included in the light reflective layer B and blocking moisture that has permeated through the resin material layer J to keep the moisture from reaching silver or a silver alloy included in the light reflective layer B, and thus discoloration of silver or a silver alloy included in the light reflective layer B can be suppressed.

When ultraviolet rays are absorbed by the protective layer D formed from the polyolefin resin, the protective layer D deteriorates while forming radicals on the side of its surface apart from the light reflective layer B, but the generated radicals do not reach the light reflective layer B because the protective layer D has a thickness of 300 nm or more. Also, although the protective layer D deteriorates while forming radicals, the progress of deterioration is slow because absorption of ultraviolet rays is low, and therefore, the protective layer D exhibits the above-described blocking function for a long period of time.

In the case where the protective layer D is formed from an ethylene terephthalate resin with a thickness of 17 µm or more and 40 µm or less, the ethylene terephthalate resin is a synthetic resin that has a higher absorptivity for ultraviolet rays than the polyolefin resin in the wavelength range of ultraviolet rays from 0.3 µm to 0.4 µm. However, the protective layer has a thickness of 17 µm or more, and therefore, the protective layer D favorably exhibits the blocking function of blocking radicals generated in the resin material layer J to keep the radicals from reaching silver or a silver alloy included in the light reflective layer B and blocking moisture that has permeated through the resin material layer J to keep the moisture from reaching silver or a silver alloy included in the light reflective layer B for a long period of time, and thus discoloration of silver or a silver alloy included in the light reflective layer B can be suppressed.

That is, the protective layer formed from the ethylene terephthalate resin deteriorates by absorbing ultraviolet rays while forming radicals on the side of its surface apart from the light reflective layer B, but the generated radicals do not reach the light reflective layer because the protective layer has a thickness of 17 µm or more. Also, although the protective layer deteriorates while forming radicals, the protective layer exhibits the blocking function for a long period of time because the thickness is 17 µm or more.

When described in more detail, the ethylene terephthalate resin (PET) deteriorates as a result of ester bonds of ethylene glycol and terephthalic acid being cleaved by ultraviolet rays and radicals being formed. This deterioration progresses sequentially from the surface of the ethylene terephthalate resin (PET) irradiated with ultraviolet rays.

For example, when the ethylene terephthalate resin (PET) is irradiated with ultraviolet rays with an intensity equivalent to that in Osaka, ester bonds of the ethylene terephthalate resin (PET) are cleaved sequentially from the irradiated surface by a depth of about 9 nm per day. The ethylene terephthalate resin (PET) has been sufficiently polymerized, and therefore, a surface portion of the ethylene terephthalate resin (PET) where the cleavage has occurred does not damage silver (silver alloy) included in the light reflective layer B, but when a cleaved end of the ethylene terephthalate resin (PET) reaches the silver (silver alloy) included in the light reflective layer B, the silver (silver alloy) is discolored.

Therefore, in order to make the protective layer D durable for a year or longer when used outdoors, the protective layer needs to have a thickness of about 3 µm, which is calculated by adding up 9 nm/day for 365 days. In order to make the protective layer D formed from the ethylene terephthalate resin (PET) durable for three years or longer, the protective layer needs to have a thickness of 10 µm or more. In order to make the protective layer D durable for five years or longer, the protective layer needs to have a thickness of 17 µm or more.

Note that the upper limit value of the thickness of the protective layer D is set for the cases where the protective layer D is formed from the polyolefin resin or the ethylene terephthalate resin in order to avoid a situation in which the protective layer D exhibits thermal insulation properties, which do not contribute to radiative cooling. That is, as the thickness of the protective layer D is increased, the protective layer D exhibits thermal insulation properties, which do not contribute to radiative cooling, and therefore, the upper limit value of the thickness is set to prevent the protective layer D from exhibiting thermal insulation properties, which do not contribute to radiative cooling, while allowing the protective layer D to exhibit the function of protecting the light reflective layer B.

In the case where the radiative cooling device includes the adhesive layer N between the resin material layer J and the protective layer D as shown in FIG. 7, radicals are generated from the adhesive layer N as well, but it is possible to keep the radicals generated in the adhesive layer N from reaching the light reflective layer B for a long period of time when the thickness of the polyolefin resin forming the protective layer D is 300 nm or more or the thickness of the ethylene terephthalate resin forming the protective layer D is 17 µm or more.

Note that, when the thickness of the protective layer D is increased, there is no demerit in preventing coloration of silver (silver alloy) included in the light reflective layer B, but there arises a problem in radiative cooling as described above. That is, thermal insulation properties of a radiative cooling material are enhanced when the thickness is increased.

Figure 13:
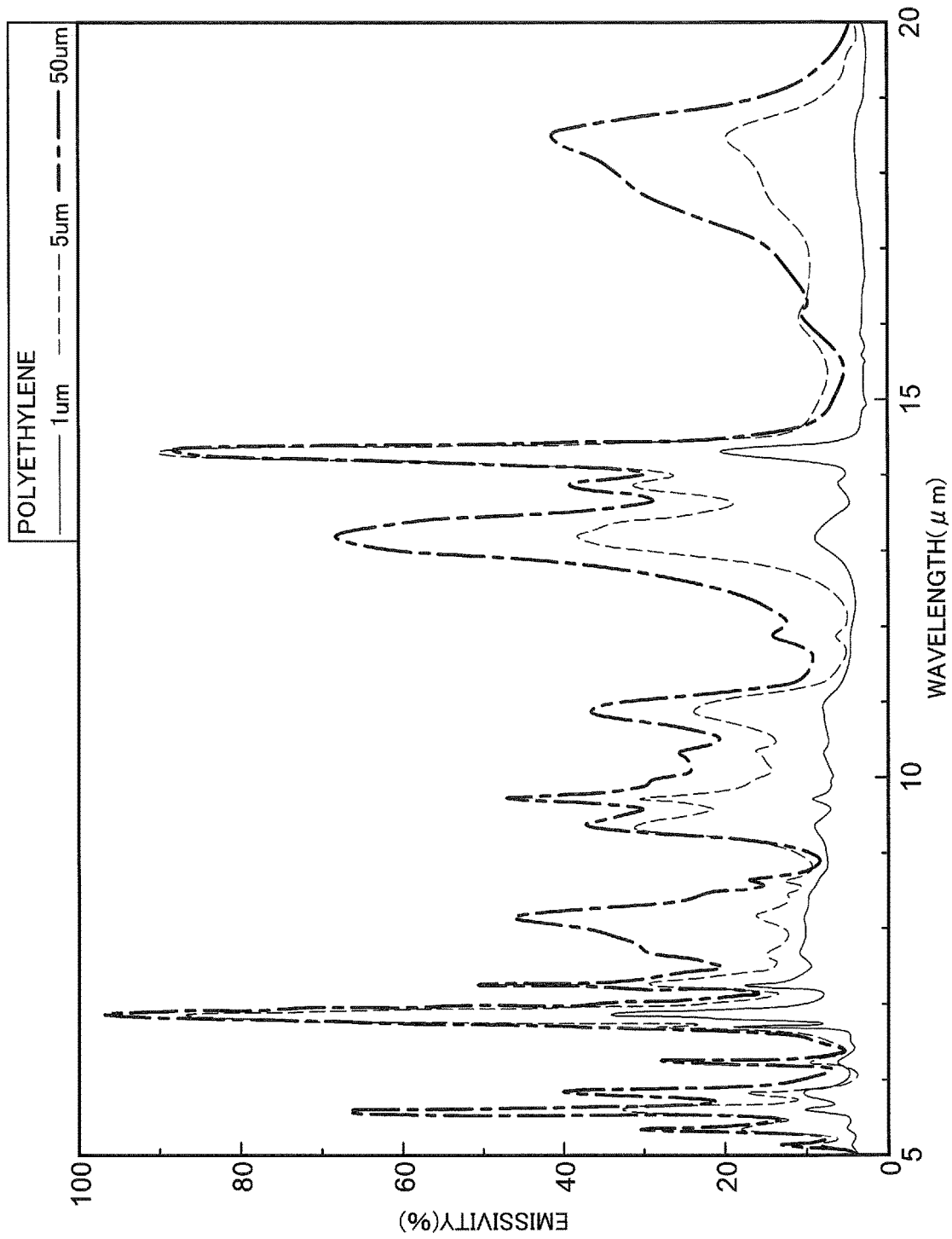
FIG. 13 is a diagram showing an emissivity spectrum of polyethylene.

For example, in the case of a resin that contains polyethylene as a main component, which is an excellent synthetic resin for forming the protective layer D, the emissivity in the atmospheric window is small as shown in FIG. 13, and therefore, even if the thickness is increased, the increase does not contribute to radiative cooling. Conversely, thermal insulation properties of the radiative cooling material are enhanced when the thickness is increased. Next, when the thickness is increased, absorption through vibration of the main chain increases in the near-infrared range, and an effect of increasing absorption of sunlight increases.

For these reasons, a protective layer D having a large thickness is disadvantageous in radiative cooling. From the viewpoints described above, the thickness of the protective layer D formed from the polyolefin resin is preferably 5 µm or less, and more preferably 1 µm or less.

[Consideration on Protective Layer]

Figure 10:
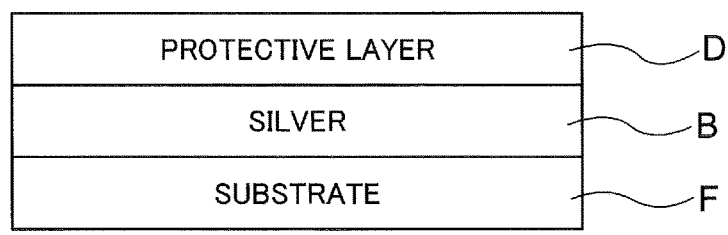
FIG. 10 is a diagram showing a configuration for a test.

In order to examine a difference in coloration of silver according to the protective layer D, samples that did not include the resin material layer J as the infrared radiative layer A and in which the protective layer D was exposed were produced as shown in FIG. 10 and coloration of silver after the samples were irradiated with simulated sunlight was examined.

That is, two types of resins, one of which being a common acrylic resin that absorbs ultraviolet rays (e.g., a methyl methacrylate resin in which a benzotriazole ultraviolet absorbing agent is mixed) and the other being polyethylene, were each applied as the protective layer D to a film layer F (corresponding to a substrate) provided with silver that functioned as the light reflective layer B, with use of a bar coater to form the samples, and functions of the resins as the protective layer D were examined. Thicknesses of the applied protective layers D were 10 μm and 1 μm, respectively.

Note that the film layer F (corresponding to a substrate) was formed in a film shape from PET (ethylene terephthalate resin) or the like.

Figure 12:
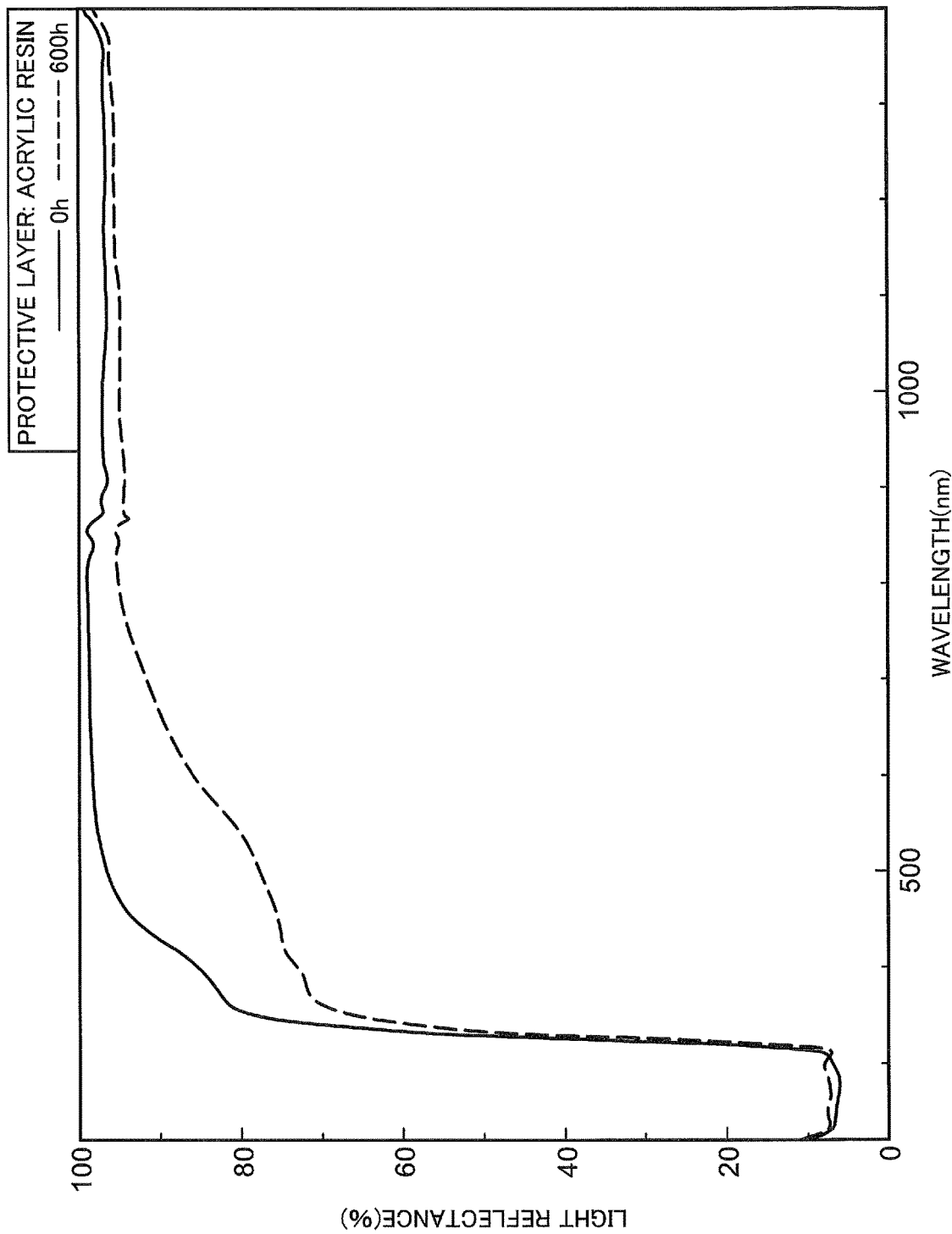
FIG. 12 is a diagram showing a test result of a case where the protective layer was made of an ultraviolet absorbing acrylic resin.

As shown in FIG. 12, in the case where the protective layer D was formed from the acrylic resin that absorbs ultraviolet rays well, the protective layer D was decomposed by ultraviolet rays and formed radicals, and silver was immediately discolored to yellow, which makes the radiative cooling device CP unable to function no longer (i.e., the radiative cooling device absorbs sunlight and the temperature increases under solar radiation, as is the case with common materials).

Note that the line denoted by 600 h in FIG. 12 shows a reflectance spectrum after a xenon weather test (ultraviolet light energy: 60 W/m$^2$) was performed for 600 h (hours) under the conditions specified in JIS 5600-7-7. Also, the line denoted by 0 h shows a reflectance spectrum before the xenon weather test was performed.

Figure 11:
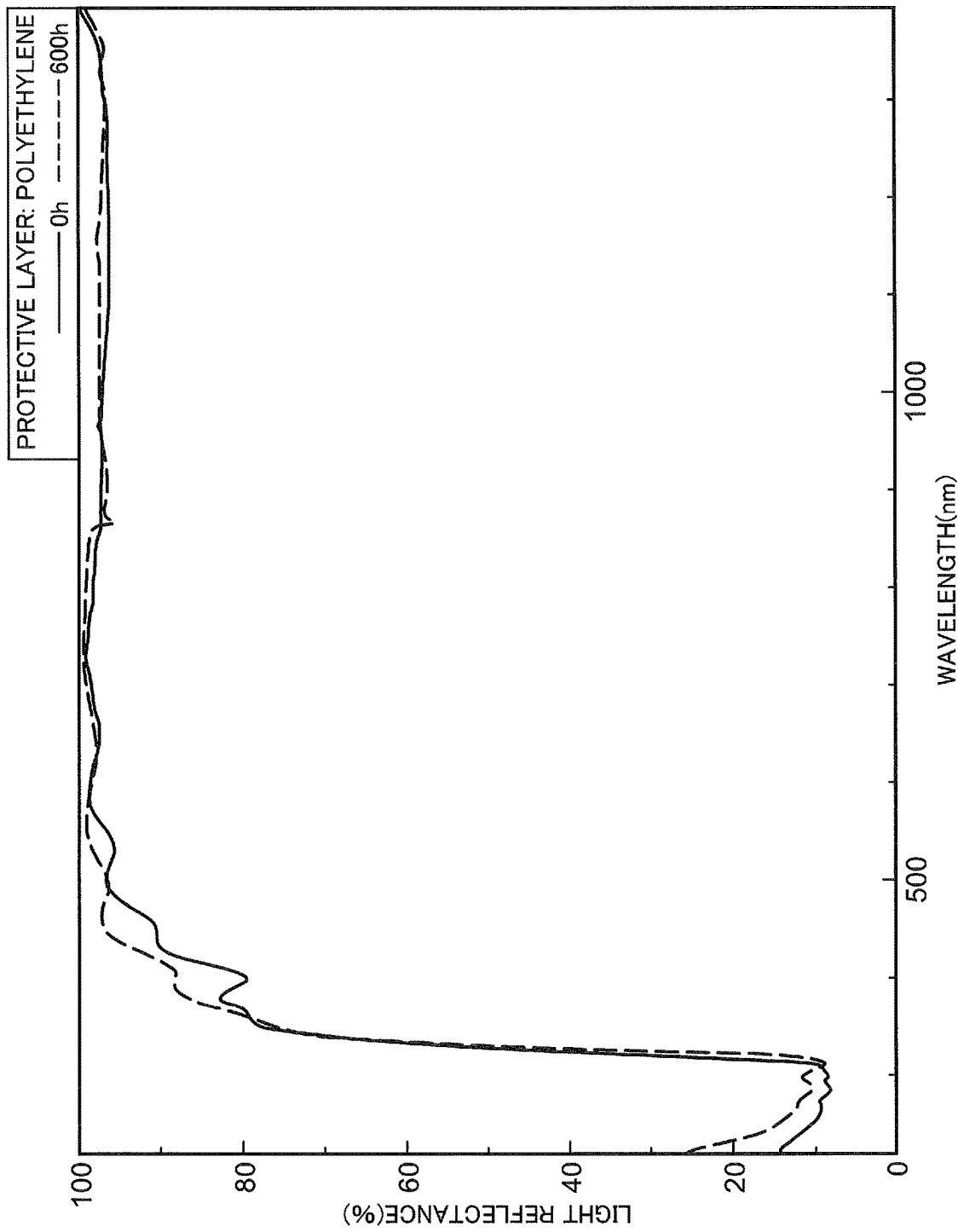
FIG. 11 is a diagram showing a test result of a case where a protective layer was made of polyethylene.

As shown in FIG. 11, in the case where the protective layer D was formed from polyethylene that has a low absorptivity for ultraviolet rays, it can be found that the reflectance did not decrease in the near infrared range and the visible range. That is, a resin (polyolefin resin) that contains polyethylene as a main component absorbs almost no ultraviolet rays included in the sunlight reaching the ground, and accordingly, is unlikely to form radicals even when irradiated with sunlight. Therefore, silver included in the light reflective layer B is not colored even under solar radiation.

Note that the line denoted by 600 h in FIG. 11 shows a reflectance spectrum after a xenon weather test (ultraviolet light energy: 60 W/m$^2$) was performed for 600 h (hours) under the conditions specified in JIS 5600-7-7. Also, the line denoted by 0 h shows a reflectance spectrum before the xenon weather test was performed.

Note that the reflectance spectrums in this wavelength range wave because of Fabry-Pérot resonance of the polyethylene layer. It can be found that positions of the resonance slightly differ between the line denoted by 0 h and the line denoted by 600 h due to the thickness of the polyethylene layer being changed by heat applied during the xenon weather test, for example, but no significant decrease in the reflectance due to discoloration of silver to yellow is observed in the ultraviolet-visible range.

Note that a fluorocarbon resin can also be used as a material of the protective layer D from the viewpoint of ultraviolet absorption, but when the protective layer D is actually formed from a fluorocarbon resin, the fluorocarbon resin is colored and deteriorates while the protective layer D is formed. Therefore, the fluorocarbon resin cannot be used as a material of the protective layer D.

Also, silicone can be used as a material of the protective layer D from the viewpoint of ultraviolet absorption, but adhesion between silicone and silver (silver alloy) is very bad, and therefore, silicone cannot be used as a material of the protective layer D.

[Consideration on Plasticizer]

The following considers the plasticizer mixed in the vinyl chloride-based resin.

(Deterioration of Vinyl Chloride-Based Resin)

Deterioration of the plasticizer due to ultraviolet rays is significantly involved in deterioration of the vinyl chloride-based resin (film) due to sunlight.

Commonly, a vinyl chloride-based resin (in which a plasticizer is mixed) that is used outdoors for a long period of time is protected from ultraviolet rays included in sunlight by being colored or containing an additive. For example, the vinyl chloride-based resin is often colored in black so as not to be affected by ultraviolet rays. On the other hand, in the case of the radiative cooling device CP, absorption of sunlight needs to be minimized in order for the radiative cooling device CP to have radiative cooling properties. Therefore, it is not possible to add a sufficient amount of additive, dye, or pigment for protecting the plasticizer.

For example, as shown in FIG. 7, the radiative cooling device CP includes: the adhesive layer N (joining layer) and the protective layer D under the resin material layer J formed by the vinyl chloride resin; and the light reflective layer B including silver under the protective layer D. The resin material layer J is more likely to be affected by sunlight under the influence of the light reflective layer B. That is, sunlight that has entered the radiative cooling device CP is reflected by the light reflective layer B, and accordingly, passes through the resin material layer J twice. That is, the influence of sunlight on deterioration is about twice as much as that of an ordinary case.

Also, the radiative cooling device CP including the resin material layer J that is formed on the light reflective layer B including silver is affected by sunlight more than a radiative cooling device CP including a resin material layer J that is formed on aluminum, iron, or ceramics whose reflectance is lower than that of silver.

The foregoing suggests that the vinyl chloride resin in the radiative cooling device CP in which the resin material layer J is formed on the light reflective layer B including silver is more sensitive to ultraviolet rays included in sunlight than general-purpose vinyl chloride resins.

Deterioration of an ester plasticizer due to ultraviolet rays occurs mainly as a result of the plasticizer absorbing UV energy.

Absorption of ultraviolet rays occurs mainly through electron transition that involves energy higher than bond energy of an ester bond included in the plasticizer. Hydrolysis of the plasticizer mixed in the vinyl chloride-based resin progresses in the presence of water molecules and activation energy received from ultraviolet rays.

When a bond included in the plasticizer is cut off, the cut bond attacks surrounding molecules of the vinyl chloride-based resin, causing dehydrochlorination or the like, and the vinyl chloride-based resin is colored. Moreover, mechanical strength also decreases.

When the vinyl chloride-based resin is colored, the radiative cooling device CP absorbs sunlight, and accordingly, cannot cool the cooling target during the day.

Therefore, plasticizers (trimellitic acid esters and epoxidized aliphatic acid esters) that are used outdoors while being directly exposed to sunlight in other applications cannot be used for the radiative cooling device CP, and it is possible to use phthalic acid esters, aliphatic dibasic acid esters, phosphoric acid triesters, and aromatic phosphoric acid esters as plasticizers in the radiative cooling device CP as indicated by the experimental result shown in FIG. 14.

(Protectability of Resin Material Layer Realized by Ultraviolet Absorbing Agent)

An ultraviolet absorbing agent was mixed with the vinyl chloride resin forming the resin material layer J of the radiative cooling device CP used in the experiment to adjust the reflectance of the radiative cooling device CP at the time of its production in a wavelength range from 295 nm to 350 nm to 10% or less (see FIG. 14).

The ultraviolet absorbing agent is for protecting the adhesive layer N (joining layer), the protective layer D, and the light reflective layer B including silver, which are under the resin material layer J, and has a limited effect of protecting the resin material layer J from ultraviolet rays.

The absorptivity (A) of the ultraviolet absorbing agent can be expressed by the following expression (2).

$$A = 1 - \exp(-\alpha t) \quad (2)$$

Note that α represents an absorption coefficient and t represents a film thickness.

It can be understood from this expression that light is gradually absorbed by the resin material layer J (vinyl chloride layer) while traveling through the resin material layer J. That is, it is not possible to expect an effect of protecting the resin material layer J (vinyl chloride layer) from ultraviolet rays realized by the ultraviolet absorbing agent particularly on the side of the resin material layer J on which sunlight is incident.

That is, it was found through the experiment that when trimellitic acid was used as the plasticizer, deterioration of the radiative cooling device CP progresses in such a manner that the surface (radiative surface H) irradiated with sunlight is gouged.

(Suitable Plasticizer and Unsuitable Plasticizer)

Plasticizers that are suitable to be mixed in the vinyl chloride-based resin are phthalic acid esters, aliphatic dibasic acid esters, phosphoric acid triesters, and aromatic phosphoric acid esters as described above.

It is preferable that an aliphatic dibasic acid ester is formed through ester bonding between an aliphatic dibasic acid and two molecules of a saturated aliphatic alcohol. It is preferable that a phthalic acid ester is formed through ester bonding between phthalic acid and two molecules of a saturated aliphatic alcohol.

Also, as for each of the phthalic acid esters, aliphatic dibasic acid esters, and phosphoric acid triesters, it is desirable that a hydrocarbon group included in the ester is an alkyl group.

Unsuitable plasticizers are trimellitic acid esters and epoxidized aliphatic acid esters as described above.

Unsuitable plasticizers also include phthalic acid esters, aliphatic dibasic acid esters, and phosphoric acid triesters in which the hydrocarbon group is an unsaturated hydrocarbon group. That is, it is desirable that the hydrocarbon group included in phthalic acid esters, aliphatic dibasic acid esters, and phosphoric acid triesters is a saturated hydrocarbon group.

When the hydrocarbon group is an unsaturated hydrocarbon group, the unsaturated bond causes coloration, and accordingly, sunlight is absorbed well and the radiative cooling properties are reduced. Also, the unsaturated bond is cleaved by absorbed sunlight, and a reaction with a surrounding oligomer and the vinyl chloride resin progresses. As a result, the resin material layer J of the radiative cooling device CP becomes brittle and is colored.

In short, whether a plasticizer is suitable or unsuitable depends on whether or not the plasticizer absorbs ultraviolet rays well.

(Phthalic Acid Ester)

First, phthalic acid esters, which are aromatic carboxylic acid esters, will be compared with trimellitic acid esters. Examples of phthalic acid esters include DOP (di-2-ethylhexyl phthalate) and examples of trimellitic acid esters include TOTM (tris(2-ethylhexyl) trimellitate).

In an outdoor environment irradiated with ultraviolet rays, decomposition occurs as a result of hydrolysis of ester bonds. Ultraviolet rays serve as activation energy of the reaction. Bond energy of an ester bond included in a trimellitic acid ester is weak compared with bond energy of an ester bond included in a phthalic acid ester. This difference leads to a difference in ultraviolet ray absorption.

The following expression (3) expresses a relationship between an absorption wavelength (λA) and the bond energy (E).

$$\lambda A = 1240/E \quad (3)$$

Figure 15:
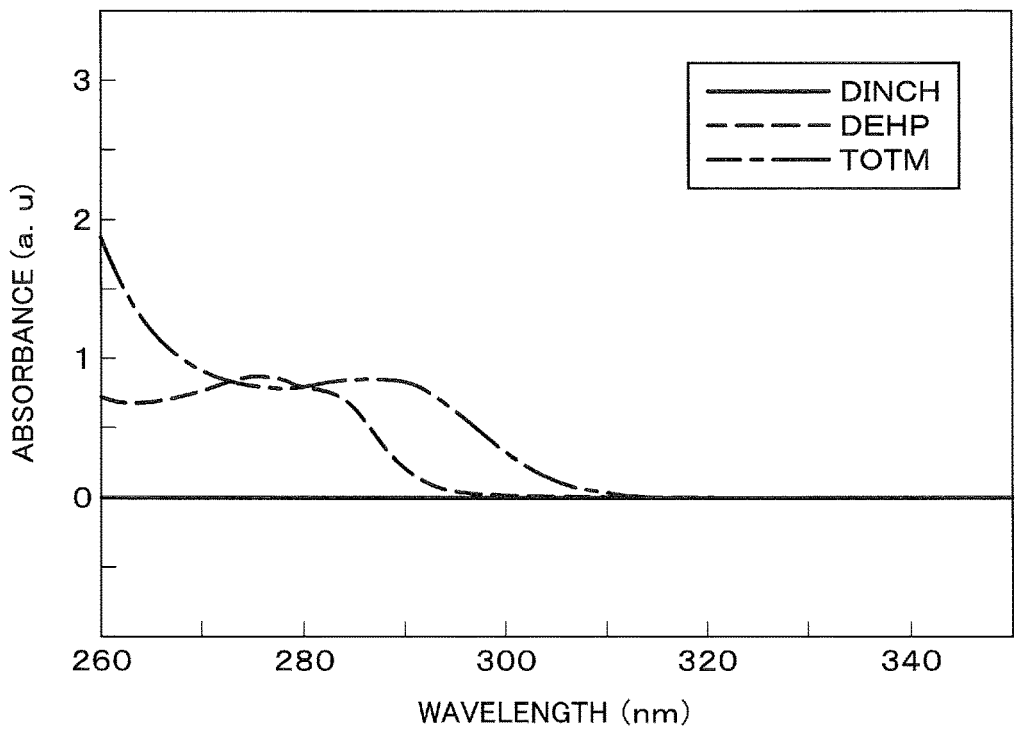
FIG. 15 is a diagram showing a relationship between the absorbance of a plasticizer and the wavelength.

This expression indicates that as the bond energy (E) decreases, the wavelength of absorbed ultraviolet rays, which activate transition of electrons included in the bond, increases. FIG. 15 shows an example.

In FIG. 15, DEHP and DINCH represent phthalic acid esters, and TOTM represents a trimellitic acid ester. Note that DEHP is the same as DOP.

Sunlight reaching the ground includes light having wavelengths longer than or equal to 295 nm, and TOTM absorbs ultraviolet rays having wavelengths longer than or equal to 295 nm well. This absorption is due to ester bonds, and ultraviolet rays serve as activation energy of hydrolysis, which is a reaction with surrounding water.

Note that the trimellitic acid ester is a plasticizer that is used in electric wires made of soft vinyl chloride, which are directly exposed to sunlight, for example, but the trimellitic acid ester cannot be used for the vinyl chloride forming the resin material layer J of the radiative cooling device CP although the radiative cooling device is also used outdoors. In common outdoor applications, a vinyl chloride layer is often kept from being affected by ultraviolet rays by being sufficiently colored black, for example, and is unlikely to deteriorate due to ultraviolet rays.

On the other hand, in the case of the radiative cooling device CP, absorption of sunlight needs to be minimized in order for the radiative cooling device CP to have radiative cooling properties, and it is not possible to add a sufficient amount of an additive, dye, or pigment for protecting the plasticizer. Therefore, plasticizers that are used outdoors while being directly exposed to sunlight in other applications cannot be used for the radiative cooling device CP.

Examples of trimellitic acid esters include tris(2-ethylhexyl) trimellitate (TOTM), tri-isononyl trimellitate (TINTM), and tri-isodecyl trimellitate (TIDTM), all of which are unsuitable.

Figure 16:
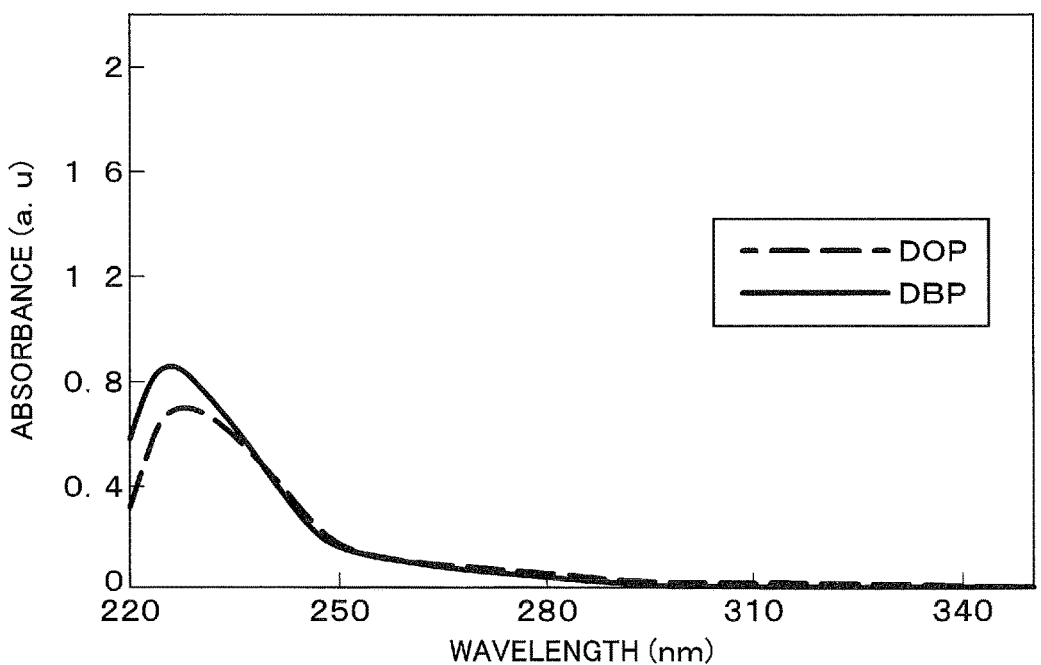
FIG. 16 is a diagram showing a relationship between the absorbance of a plasticizer and the wavelength.

FIG. 16 shows the absorbance of DOP (di-2-ethylhexyl phthalate) and the absorbance of DBP (dibutyl phthalate) as other phthalic acid esters, and it can be found that these esters hardly absorb light having wavelengths longer than or equal to 295 nm.

In the case where the hydrocarbon group is an alkyl group, the strength of an ester bond significantly depends on the type of carboxylic acid, and esters including carboxylic acids of the same type have similar tendencies in terms of ultraviolet ray absorption. In the case where the hydrocarbon group is an alkyl group, absorption of light having the longest wavelength in the ultraviolet range of 400 nm or less results from bond energy of the ester bond.

A phthalic acid ester including a hydrocarbon group that is an alkyl group does not absorb light in the ultraviolet range of 295 nm or more in the spectrum of sunlight reaching the ground, and hydrolysis of the phthalic acid ester does not progress in the presence of UV energy included in sunlight.

On the other hand, in the case of a trimellitic acid ester including a hydrocarbon group that is an alkyl group, the ester bond absorbs UV energy included in sunlight, and hydrolysis of the trimellitic acid ester progresses due to the absorbed UV energy. Acid and alcohol produced as a result of the hydrolysis absorb ultraviolet rays and a reaction with a surrounding oligomer and vinyl chloride progresses. As a result, the resin material layer J of the radiative cooling device CP becomes brittle and is colored.

That is, aromatic carboxylic acid esters that are used as plasticizers include phthalic acid esters and trimellitic acid esters, and phthalic acid esters can be used as radiative cooling materials, but trimellitic acid esters cannot be used.
(Aliphatic Dibasic Acid Ester)

As described for phthalic acid and trimellitic acid, in the case where the hydrocarbon group is an alkyl group, the strength of an ester bond significantly depends on the type of carboxylic acid, and esters including carboxylic acids of the same type have similar tendencies in terms of ultraviolet ray absorption.

The following considers a case in which the aliphatic dibasic acid included in an aliphatic dibasic acid ester is a saturated dicarboxylic acid such as adipic acid, azelaic acid, sebacic acid, or succinic acid, and the ester is formed through ester bonding between the saturated dicarboxylic acid and saturated glucose. Note that the following also applies to a copolymer of a saturated dicarboxylic acid and saturated glucose.

In such a case, only the ester bond is optically characteristic in the ultraviolet range among functional groups, and theoretically, all such aliphatic dibasic acid esters have the same absorption spectrum in the ultraviolet range (200 nm or more and 400 nm or less).

Figure 17:
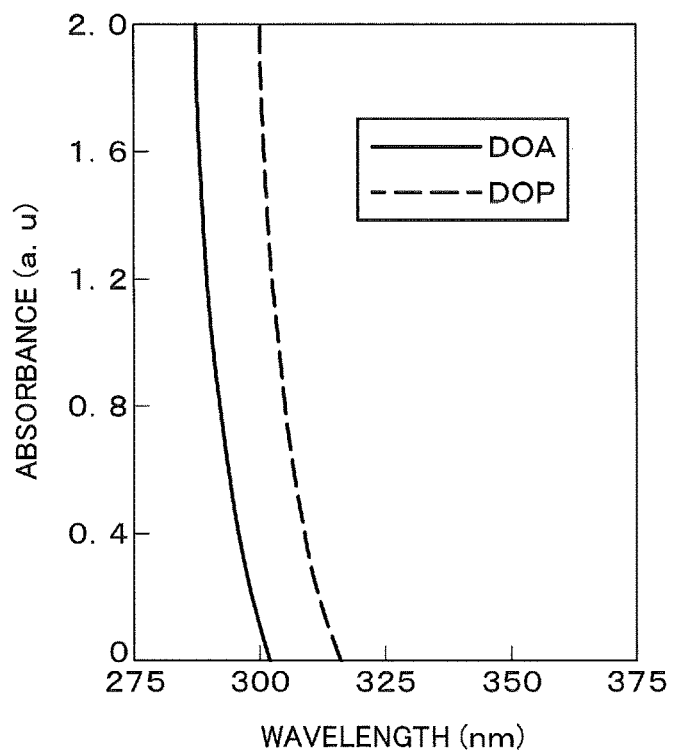
FIG. 17 is a diagram showing a relationship between the absorbance of a plasticizer and the wavelength.

The following considers DOA (di-2-ethylhexyl adipate) as a representative example of aliphatic dibasic acid esters. FIG. 17 shows the absorbance of DOA in the ultraviolet range. It can be found that the absorptivity for sunlight is even lower than that of DOP (di-2-ethylhexyl phthalate) described above, which hardly absorbs light having wavelengths longer than or equal to 295 nm.

As shown in FIG. 14, phthalic acid esters and aliphatic dibasic acid esters are durable for 2000 hours in the xenon weather test, but optical durability of DOA is higher than that of phthalic acid esters.
(Phosphoric Acid Ester)

Phosphoric acid esters that are used as plasticizers include phosphoric acid triesters and aromatic phosphoric acid esters. Phosphoric acid esters have large bond energy and are not hydrolyzed by ultraviolet rays that have wavelengths longer than or equal to 295 nm. Therefore, phosphoric acid esters are excellent plasticizers for the radiative cooling device CP. Note that flame retardancy is imparted with use of phosphoric acid esters.

As described above, examples of phosphoric acid triesters include trimethyl phosphate (TMP), triethyl phosphate (TEP), tributyl phosphate (TBP), and tris(2-ethylhexyl) phosphate (TOP).

Figure 18:
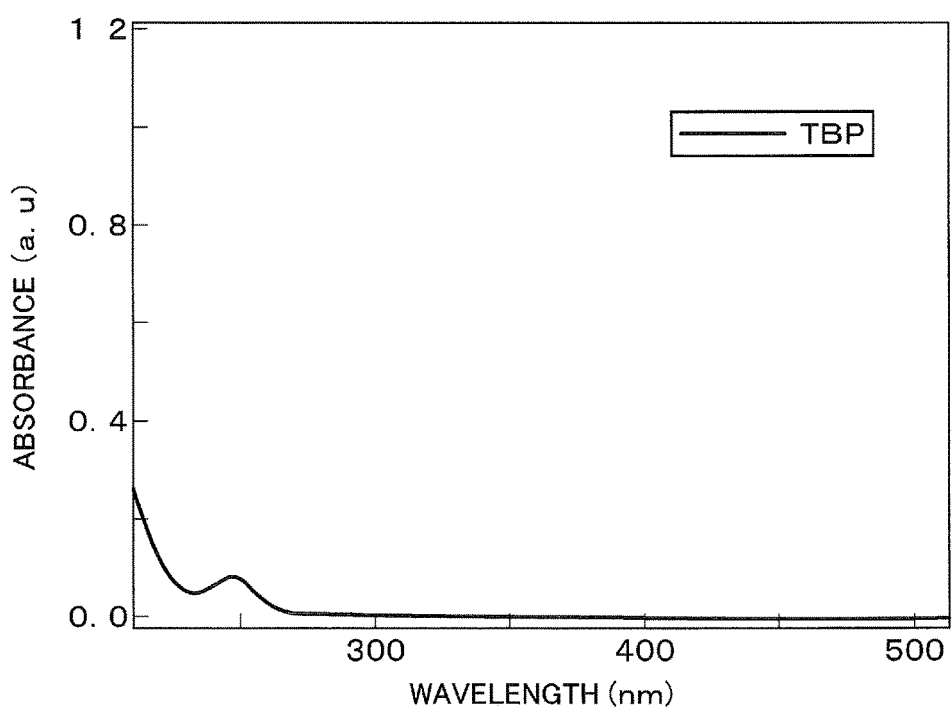
FIG. 18 is a diagram showing a relationship between the absorbance of a plasticizer and the wavelength.

FIG. 18 shows the absorbance of tributyl phosphate (TBP). It can be found that tributyl phosphate hardly absorbs ultraviolet rays having wavelengths longer than or equal to 295 nm.

As described above, examples of aromatic phosphoric acid esters include triphenyl phosphate (TPP), tricresyl phosphate (TCP), trixylenyl phosphate (TXP), cresyl diphenyl phosphate (CDP), and 2-ethylhexyldiphenyl phosphate.

Aromatic phosphoric acid esters hardly absorb ultraviolet rays having wavelengths longer than or equal to 295 nm, although this is not shown.
(Epoxidized Aliphatic Acid Ester)

Epoxidized aliphatic acid esters absorb ultraviolet rays having wavelengths longer than or equal to 295 nm well, similarly to TOTM (trimellitic acid ester) described above.

That is, the epoxy group included in epoxidized aliphatic acid esters decomposes by absorbing ultraviolet rays having wavelengths longer than or equal to 295 nm. Also, epoxidized aliphatic acid esters are decomposed by microorganisms. Therefore, epoxidized aliphatic acid esters cannot be used outdoors.

Note that examples of epoxidized aliphatic acid esters include epoxidized esters such as epoxidized soybean oil and epoxidized linseed oil, all of which cannot be used as the plasticizer mixed in the vinyl chloride-based resin in the radiative cooling device CP.
[Another Configuration of Radiative Cooling Device]

Figure 19:
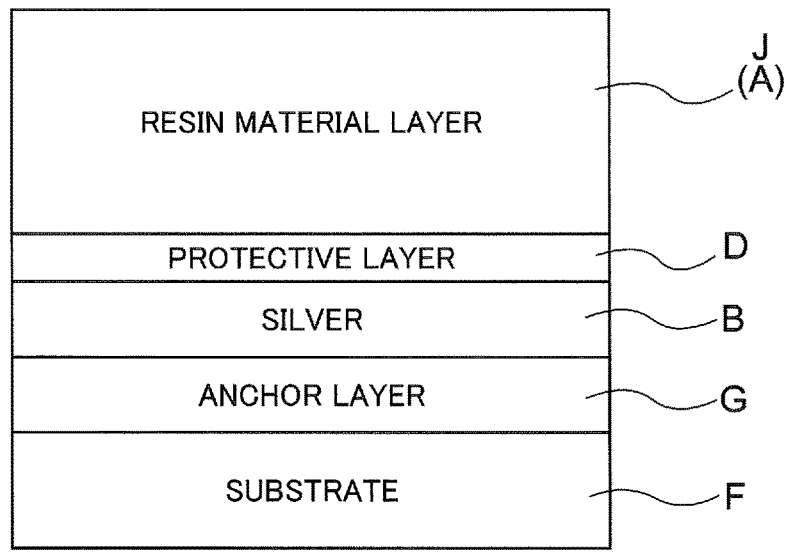
FIG. 19 is a diagram showing another configuration of a radiative cooling device.

As shown in FIG. 19, the radiative cooling device may include an anchor layer G on a film layer F (corresponding to a substrate), and the light reflective layer B, the protective layer D, and the infrared radiative layer A (the resin material layer J formed from a vinyl chloride resin in which a plasticizer is mixed) may be formed on the anchor layer G.

Note that the film layer F (corresponding to a substrate) is formed in a film shape from PET (ethylene terephthalate resin) or the like, for example.

The anchor layer is introduced to strengthen adhesion between the film layer F and the light reflective layer B. That is, when a silver (Ag) layer is directly formed on the film layer F, the silver layer may be easily peeled off. It is desirable that the anchor layer G contains an acrylic resin, a polyolefin, or urethane as a main component, and a compound that has an isocyanate group or a melamine resin is mixed therein. The anchor layer is a coating applied to a portion that is not directly irradiated with sunlight, and may be constituted by a material that absorbs ultraviolet rays.

Note that adhesion between the film layer F and the light reflective layer B can be strengthened with use of a method other than the method of introducing the anchor layer G. For example, when the surface of the film layer F, on which another layer is to be formed, is roughened by being irradiated with plasma, adhesion is strengthened.
[Another Configuration of Infrared Radiative Layer]

Figure 20:
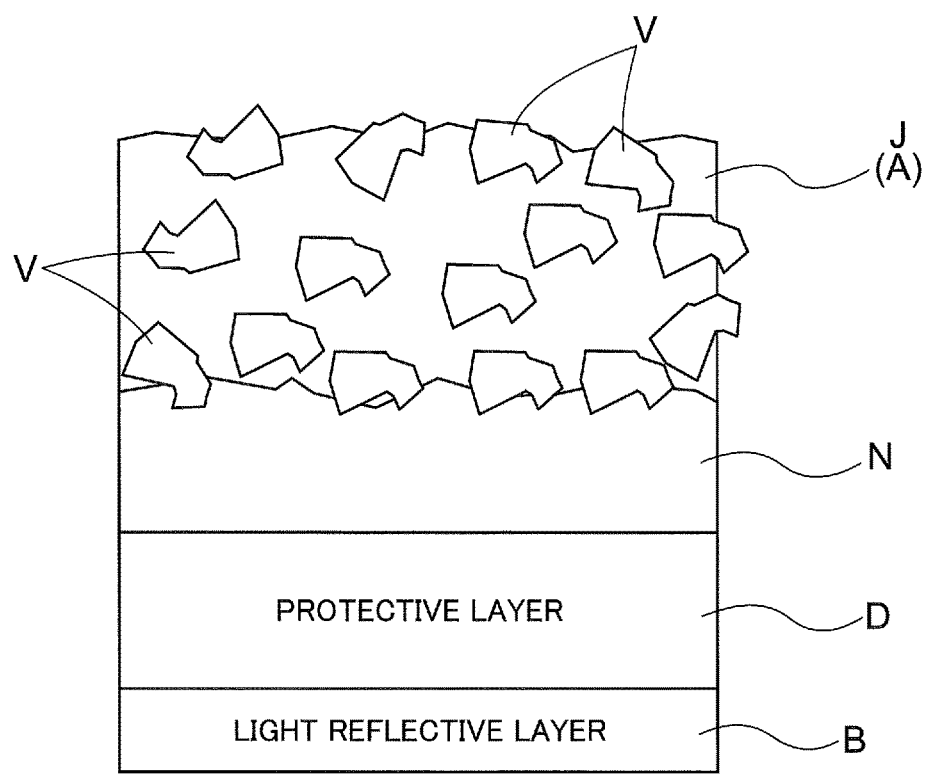
FIG. 20 is a diagram showing a configuration in which a filler is mixed in a resin material layer.
Figure 21:
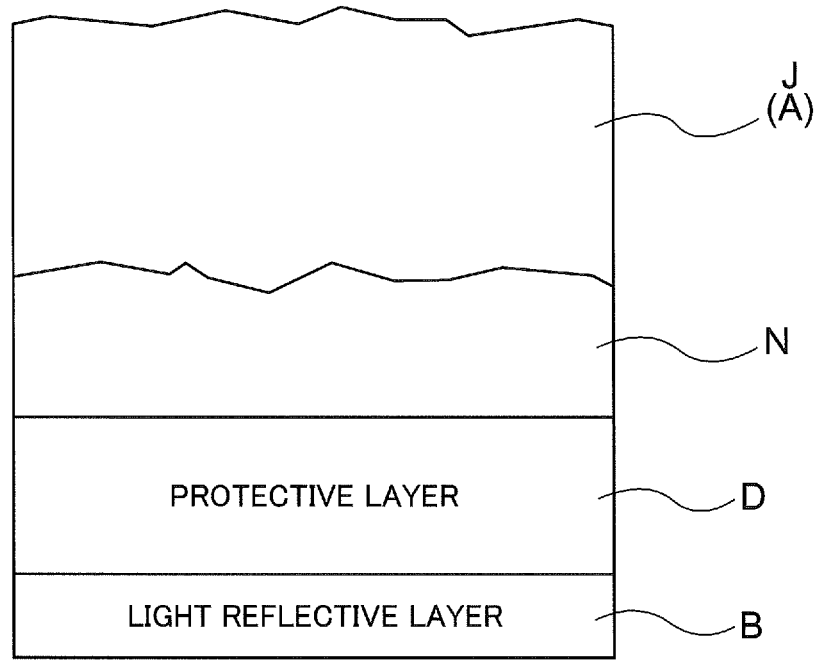
FIG. 21 is a diagram showing a configuration in which irregularities are formed in front and rear surfaces of the resin material layer.

As shown in FIG. 20, a filler V made of an inorganic material may be mixed in the resin material layer J (vinyl chloride resin in which the plasticizer is mixed) constituting the infrared radiative layer A to provide the resin material layer J with a light scattering configuration. Alternatively, as shown in FIG. 21, irregularities may be formed in front and rear surfaces of the resin material layer J constituting the infrared radiative layer A to provide a light scattering configuration.

With these configurations, it is possible to suppress glare on the radiative surface H when the radiative surface H is seen.

That is, front and rear surfaces of the resin material layer J described above are both flat and the filler V is not mixed in the resin material layer J. In this case, the radiative surface H is a mirror surface and there is glare when the radiative surface H is seen, but the glare can be suppressed with the light scattering configurations.

Moreover, in the case where the filler V is mixed in the resin material layer J, the light reflectance is increased when there are the protective layer D and the light reflective layer B, when compared with a case where there is only the resin material layer J in which the filler V is mixed or there is only the light reflective layer B.

Inorganic materials such as silicon dioxide ($SiO_2$), titanium oxide ($TiO_2$), aluminum oxide ($Al_2O_3$), and magnesium oxide (MgO) can be preferably used as the filler V. Note that when the filler V is mixed in the resin material layer J, irregularities are formed in both front and rear surfaces of the resin material layer J.

Irregularities can also be formed in both of the front and rear surfaces of the resin material layer J through embossing processing or processing for scratching the surfaces, for example.

In the case where irregularities are formed in the rear surface of the resin material layer J, it is desirable to provide the adhesive layer N (joining layer) between the resin material layer J and the protective layer D as in the configuration shown in FIG. 7.

That is, even if there are irregularities in the rear surface of the resin material layer J, it is possible to appropriately join the resin material layer J to the protective layer D due to the adhesive layer N (joining layer) between the resin material layer J and the protective layer D.

Note that in the case where there are irregularities in the rear surface of the resin material layer J, it is also possible to directly join the resin material layer J to the protective layer D through plasma bonding, for example. In the plasma bonding, radicals are formed on joining surfaces of the resin material layer J and the protective layer D by emitting plasma toward these surfaces, and the surfaces are bonded by the radicals.

When the filler V is mixed in the protective layer D, irregularities are formed in the rear surface of the protective layer D that comes into contact with the light reflective layer B, and consequently irregularities are formed in the surface of the light reflective layer B, and therefore, the filler V needs to be kept from being mixed in the protective layer D. That is, when irregularities are formed in the surface of the light reflective layer B, the light reflective layer B cannot reflect light appropriately, and consequently, radiative cooling cannot be performed appropriately.

In this regard, an experimental result will be described based on FIG. 22.

Figure 22:
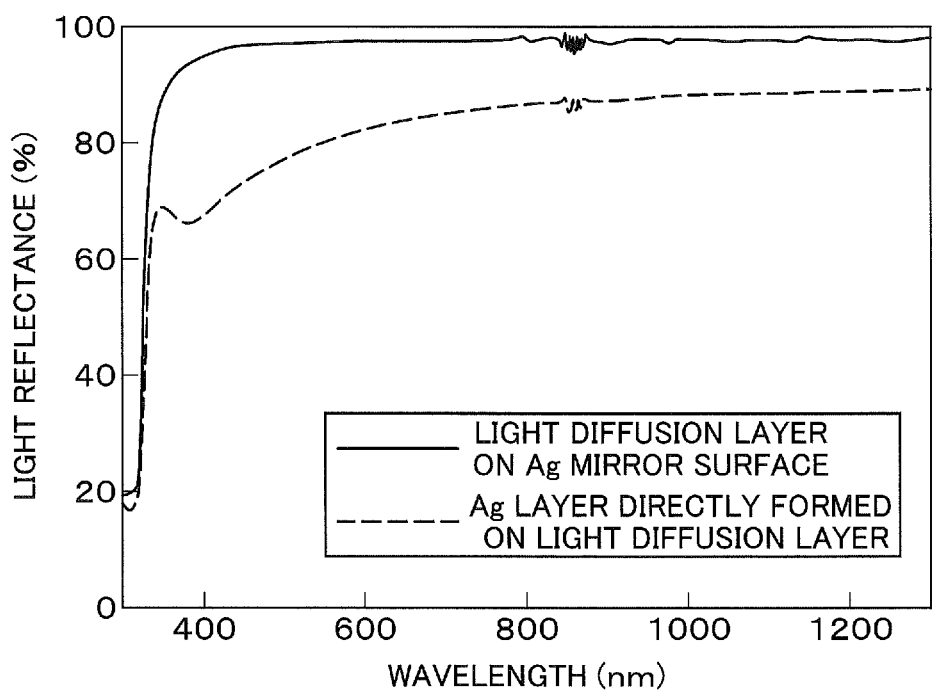
FIG. 22 is a graph showing an experimental result.

In FIG. 22, "Ag layer directly formed on light diffusion layer" means that the light reflective layer B was formed from silver (Ag) through vapor deposition or the like on a surface of the infrared radiative layer A (resin material layer J) in which the filler V was mixed or irregularities were formed through embossing processing in a surface facing the Ag layer, i.e., the light reflective layer B.

Also, "light diffusion layer on Ag mirror surface" means that the upper surface of the Ag layer, i.e., the light reflective layer B, was formed into a mirror surface, and the protective layer D and the infrared radiative layer A (resin material layer J) in which the filler V was mixed or irregularities were formed through embossing processing were stacked on the Ag layer.

As shown in FIG. 22, in the case of "Ag layer directly formed on light diffusion layer", irregularities were formed in a surface of the light reflective layer B, and therefore, the light reflectance significantly decreased, but in the case of "light diffusion layer on Ag mirror surface", the mirror surface of the light reflective layer B was maintained and an appropriate reflectance was obtained.

Other Embodiments

Other embodiments are listed below.

(1) In the above embodiment, an object that is in close contact with the rear surface of the radiative cooling device CP (radiative cooling film) is described as an example of the cooling target E, but the radiative cooling device CP is applicable to various cooling targets E such as a space to be cooled.

(2) In the above embodiment, configurations in which the radiative surface H of the resin material layer J is exposed are described as examples, but a configuration is also possible in which the radiative surface H is covered with a hard coat.

Examples of materials of the hard coat include a UV-curable acrylic material, a thermosetting acrylic material, a UV-curable silicone material, a thermosetting silicone material, an organic-inorganic hybrid material, and vinyl chloride, and any of these may be used. An organic antistatic agent may also be used as an additive.

Among UV-curable acrylic materials, urethane acrylate is particularly preferable.

The hard coat can be formed through gravure coating, bar coating, knife coating, roll coating, blade coating, die coating, or the like.

The thickness of the hard coat (coating layer) is 1 to 50 μm, and particularly preferably 2 to 20 μm.

The configurations disclosed in the above embodiments (including the other embodiments, the same applies hereinafter) can be applied in combination with configurations disclosed in other embodiments so long as no contradiction arises. Also, the embodiments disclosed in the present specification are examples, and embodiments of the present invention are not limited to the disclosed embodiments, and can be modified as appropriate within a range not deviating from the object of the present invention.

DESCRIPTION OF REFERENCE SIGNS

A: Infrared radiative layer
B: Light reflective layer
D: Protective layer
H: Radiative surface
J: Resin material layer
N: Joining layer

The invention claimed is:
1. A radiative cooling device comprising:
an infrared radiative layer having a radiative surface for radiating infrared light;
a light reflective layer on a side of the infrared radiative layer, which is opposite to the radiative surface; and
a protective layer between the infrared radiative layer and the light reflective layer,
wherein:
the infrared radiative layer is a resin material layer that has a thickness adjusted so that the resin material layer emits heat radiation energy greater than absorbed solar energy in a wavelength range from 8 μm to 14 μm,
the resin material layer comprises a vinyl chloride-based resin as a resin material in which a plasticizer is mixed, and
the plasticizer is at least one compound selected from the group consisting of phthalic acid esters, aliphatic dibasic acid esters, and phosphoric acid esters;
the light reflective layer comprises silver or a silver alloy and has a thickness of 50 nm or more; and the protective layer comprises a polyolefin resin and has a thickness of 300 nm or more and 40 µm or less or comprises a polyethylene terephthalate resin and has a thickness of 17 µm or more and 40 µm or less.

2. The radiative cooling device according to claim 1, wherein the plasticizer is mixed in an amount of 1 part by weight or more and 200 parts by weight or less relative to 100 parts by weight of the vinyl chloride-based resin.

3. The radiative cooling device according to claim 1, wherein the plasticizer comprises at least one aliphatic dibasic acid ester selected from the group consisting of adipic acid esters, adipic acid ester copolymers, azelaic acid esters, azelaic acid ester copolymers, sebacic acid esters, sebacic acid ester copolymers, succinic acid esters, and succinic acid ester copolymers.

4. The radiative cooling device according to claim 1, wherein the plasticizer comprises an aliphatic dibasic acid ester formed through ester bonding between an aliphatic dibasic acid and two molecules of a saturated aliphatic alcohol.

5. The radiative cooling device according to claim 1, wherein the plasticizer comprises a phthalic acid ester formed through ester bonding between phthalic acid and two molecules of a saturated aliphatic alcohol.

6. The radiative cooling device according to claim 1, wherein the plasticizer comprises a phosphoric acid ester that is a phosphoric acid triester or an aromatic phosphoric acid ester.

7. The radiative cooling device according to claim 1, wherein the thickness of the resin material layer is adjusted so that the resin material layer has:
light absorption properties that allow for a wavelength average absorptivity of 13% or less in a wavelength range from 0.4 µm to 0.5 µm, a wavelength average absorptivity of 4% or less in a wavelength range from 0.5 µm to 0.8 µm, a wavelength average absorptivity of 1% or less in a wavelength range from 0.8 µm to 1.5 µm, and a wavelength average absorptivity of 40% or less in a wavelength range from 1.5 µm to 2.5 µm; and
heat radiation properties that allow for a wavelength average emissivity of 40% or more in the wavelength range from 8 µm to 14 µm.

8. The radiative cooling device according to claim 1, wherein the resin material layer has a thickness of 10 µm or more and 100 µm or less.

9. The radiative cooling device according to claim 1, wherein the light reflective layer has a reflectance of 90% or more in a wavelength range from 0.4 µm to 0.5 µm, and a reflectance of 96% or more with respect to light having a wavelength longer than 0.5 µm.

10. The radiative cooling device according to claim 1, wherein the resin material layer, the protective layer, and the light reflective layer are stacked on one another in a form of a film.

11. The radiative cooling device according to claim 1, wherein the resin material layer is joined to the protective layer via a joining layer comprising an adhesive agent or a pressure-sensitive adhesive agent.

12. The radiative cooling device according to claim 11, wherein the resin material layer comprises a filler made of an inorganic material.

13. The radiative cooling device according to claim 11, wherein front and rear surfaces of the resin material layer have irregularities.

14. A radiative cooling device comprising:
an infrared radiative layer having a radiative surface for radiating infrared light; and
a light reflective layer on a side of the infrared radiative layer, which is opposite to the radiative surface, and wherein:
the infrared radiative layer is a resin material layer that has a thickness adjusted so that the resin material layer emits heat radiation energy greater than absorbed solar energy in a wavelength range from 8 µm to 14 µm, wherein the thickness of the resin material layer is adjusted so that the resin material layer has:
light absorption properties that allow for a wavelength average absorptivity of 13% or less in a wavelength range from 0.4 µm to 0.5 µm, a wavelength average absorptivity of 4% or less in a wavelength range from 0.5 µm to 0.8 µm, a wavelength average absorptivity of 1% or less in a wavelength range from 0.8 µm to 1.5 µm, and a wavelength average absorptivity of 40% or less in a wavelength range from 1.5 µm to 2.5 µm; and
heat radiation properties that allow for a wavelength average emissivity of 40% or more in the wavelength range from 8 µm to 14 µm,
the resin material layer comprises a vinyl chloride-based resin as a resin material in which a plasticizer is mixed, and
the plasticizer is at least one compound selected from the group consisting of phthalic acid esters, aliphatic dibasic acid esters, and phosphoric acid esters.

15. A radiative cooling device comprising:
an infrared radiative layer having a radiative surface for radiating infrared light; and
a light reflective layer on a side of the infrared radiative layer, which is opposite to the radiative surface, and wherein:
the infrared radiative layer is a resin material layer that has a thickness adjusted so that the resin material layer emits heat radiation energy greater than absorbed solar energy in a wavelength range from 8 µm to 14 µm,
the resin material layer comprises a vinyl chloride-based resin as a resin material in which a plasticizer is mixed, and
the plasticizer is at least one compound selected from the group consisting of phthalic acid esters, aliphatic dibasic acid esters, and phosphoric acid esters; and
the light reflective layer has a reflectance of 90% or more in a wavelength range from 0.4 µm to 0.5 µm and a reflectance of 96% or more with respect to light having a wavelength longer than 0.5 µm.

\* \* \* \* \*